United States Patent
Ino et al.

(10) Patent No.: US 6,780,657 B2
(45) Date of Patent: Aug. 24, 2004

(54) TEMPERATURE MEASURING METHOD AND APPARATUS, MEASURING METHOD FOR THE THICKNESS OF THE FORMED FILM, MEASURING APPARATUS FOR THE THICKNESS OF THE FORMED FILM THERMOMETER FOR WAFERS

(75) Inventors: Tomomi Ino, Yokohama (JP); Akira Soga, Yokohama (JP); Yoshiaki Akama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/206,186

(22) Filed: Jul. 29, 2002

(65) Prior Publication Data

US 2002/0192847 A1 Dec. 19, 2002

Related U.S. Application Data

(62) Division of application No. 09/261,972, filed on Mar. 3, 1999, now Pat. No. 6,541,287.

(30) Foreign Application Priority Data

| Mar. 19, 1998 | (JP) | 10-070812 |
| Sep. 17, 1998 | (JP) | 10-262894 |
| Sep. 29, 1998 | (JP) | 10-275350 |
| Oct. 22, 1998 | (JP) | 10-301108 |

(51) Int. Cl.[7] .......................... H01L 21/66; G01R 31/26
(52) U.S. Cl. .................................. 438/14; 438/16
(58) Field of Search ................. 438/14, 16; 374/130; 216/60; 250/29, 559

(56) References Cited

U.S. PATENT DOCUMENTS

| 5,388,907 A | 2/1995 | Aoyama et al. ............ 374/130 |
| 5,980,767 A | 11/1999 | Koshimizu et al. ........... 216/60 |
| 6,034,378 A | 3/2000 | Shiraishi ................ 250/559.29 |

FOREIGN PATENT DOCUMENTS

JP    3-63534    3/1991

OTHER PUBLICATIONS

C. Huang et al., "Optical Temperature Measurement by Grating Expansion for Rotating Semiconductor Wafers", J. Vac. Sci. Technol. A., vol. 14, No. 2, pp 271–277, Mar. 1996.

"The Authoritative Dictionary of Standards Term". Copyright 2000 by the Institute of Electrical and Electronics Engineers, Inc. ISBN–0–7381–2601–2, p. 911.

Donald Christiansen. Electronics Engineers Handbook. Copyright 1997. The McGraw–Hill Companies. pp. 9.69–9.70.

*Primary Examiner*—Erik J. Kielin
*Assistant Examiner*—David S. Blum
(74) *Attorney, Agent, or Firm*—Finnegan, Henderson, Farabow, Garrett & Dunner, L.L.P.

(57) ABSTRACT

A temperature measuring apparatus, comprises a light splitting section for splitting the light radiated from a substrate into plural light components having wavelengths over a predetermined wavelength region, a detection section for detecting the intensities of the light components obtained by the light splitting section, an integrated value calculating section for calculating an integrated value of radiation intensity by cumulatively adding the intensities of the light components detected by the detecting section, and a surface temperature calculating section for calculating the surface temperature of the substrate from the integrated value, on the basis of reference data representing the relation between the temperature and the integrated value.

22 Claims, 24 Drawing Sheets

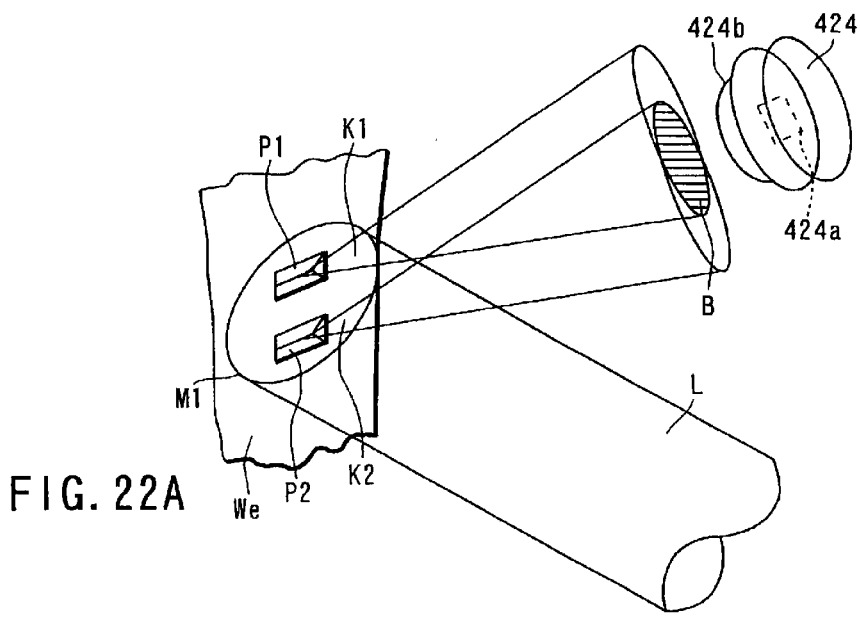
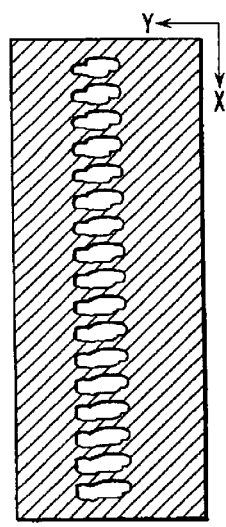
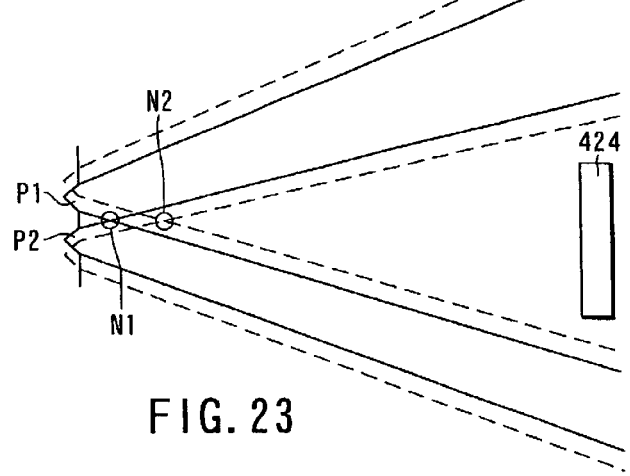
FIG. 22A
FIG. 22B
FIG. 23

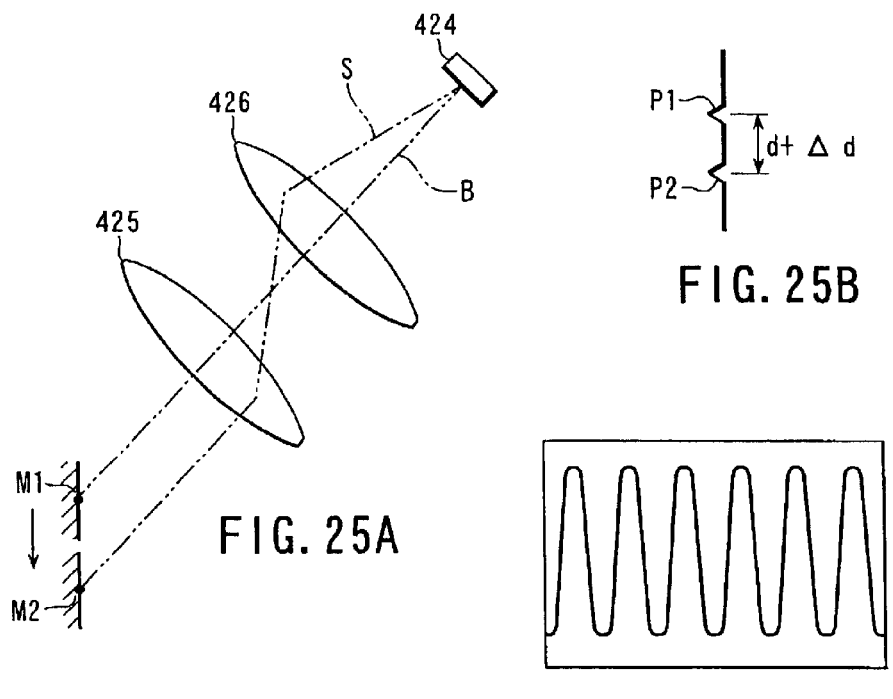
FIG. 25A
FIG. 25B
FIG. 25C
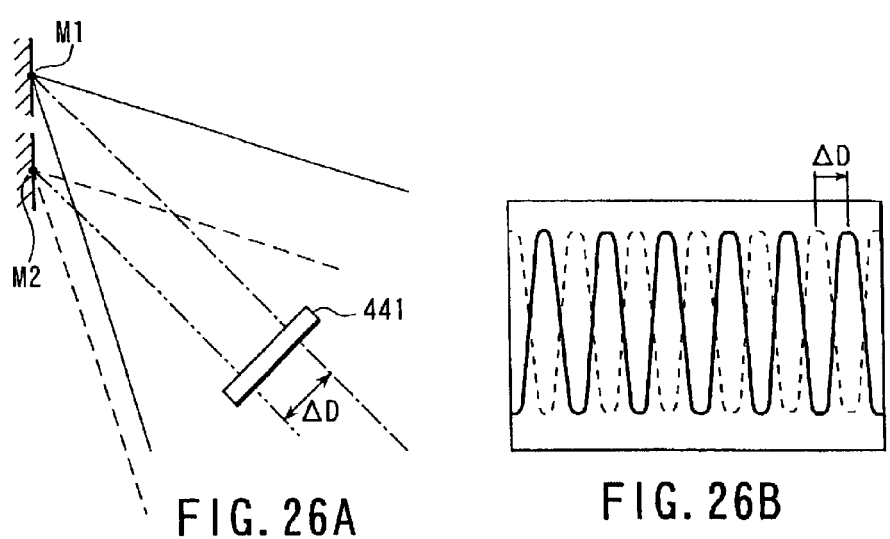
FIG. 26A
FIG. 26B

TEMPERATURE MEASURING METHOD AND APPARATUS, MEASURING METHOD FOR THE THICKNESS OF THE FORMED FILM, MEASURING APPARATUS FOR THE THICKNESS OF THE FORMED FILM THERMOMETER FOR WAFERS

This is a division of Application No. 09/261,972, now U.S. Pat. No. 6,541,287, Mar. 3, 1999, which are incorporated herein by reference.

BACKGROUND OF THE INVENTION

When the film is formed on the semiconductor wafer in CVD the temperature of a semiconductor wafer is measured by a radiation thermometer chamber, generally.

The radiation thermometer measures the wafer's temperature with a constant emissivity.

However, if the emissivity of the object is unknown or changeable, it is impossible to measure the temperature of the object accurately. When the film is formed on the surface of the object within the CVD chamber, the emissivity of the object is changed like a sine wave by affect of the thin film interference. As a result, intensity of the radiated light form the object changes like a sine wave as shown in FIG. 35, if the temperature of it doesn't change. This leas errors in measuring of the temperature with a radiation thermometer as shown in FIG. 36.

To measure the surface temperature of a wafer in the process of forming a thin film on the surface of the wafer (substrate), the surface temperature is measured by a contact method in which a sensor such as a thermocouple is disposed inside the wafer stage. Alternatively, a radiation thermometer is located above the wafer surface to detect the intensity of the radiated light for a single wavelength or two wavelengths, thereby to measure the temperature. The intensity of the radiated light changes with temperature change.

On the other hand, to measure the formation amount of a thin film, a wafer is illuminated with light emitted from a light source having a continuous spectral distribution. Then, the interference intensity of the reflected light, which is changed with increase in the film thickness, is detected so as to measure the film thickness.

Also, an ideal waveform is obtained based on an ideal model of the film construction such as the number of films, the kinds of films and the order of formation these films. In this case, the film thickness is determined based on the matching of the waveform with the ideal waveform.

However, the conventional surface temperature measuring methods described above give rise to serious problems. Specifically, in the contact method, a film is unlikely to be formed in the vicinity of the thermocouple, leading to a ununiform film formation. In the method of measuring the temperature by detecting the spectral intensity of the radiated light, it is impossible to measure accurately the surface temperature of the film. To be more specific, if the films laminated on the substrate such as a wafer differ from each other in, for example, kind, construction and thickness, the radiated light will be repeatedly reflected on the upper and lower surfaces of the films so as to bring about interference. This makes it impossible to obtain a sufficient detecting sensitivity over a measuring wavelength. It follows that it is impossible to measure accurately the surface temperature.

On the other hand, the conventional film thickness measuring method described above gives rise to an additional problem. Specifically, in this method, the film thickness is calculated by detecting how the wavelength characteristics of the reflected light are changed compared with the illuminated light. Therefore, under such a high temperature as hundreds of degrees centigrade as in a film formation process, the influence given by the radiated light is not negligible. Consequently, the film thickness cannot be measured accurately.

Further, in a film formation apparatus in which a wafer is rotated at a high speed, the film formation is affected by eccentricity and planar vibration of the wafer rotation. Therefore, it is impossible to measure the reflected light stably with a high reproducibility, making it impossible to measure accurately the film thickness.

Still further, an ideal waveform is calculated in the conventional method by using as an ideal model the construction of a film consisting of plural layers. Thus, it is impossible to measure accurately the film thickness unless the film construction is known in advance.

FIG. 37 schematically shows the principle of a wafer temperature monitoring apparatus 1 used in, for example, a conventional semiconductor processing apparatus. The wafer temperature monitoring apparatus 1 comprises a He—Ne laser device 3 for irradiating a semiconductor wafer ω housed in a chamber 2 with a laser beam 6, which is shown in FIG. 38, and a pair of CCD cameras 4 and 5 for detecting the diffracted light reflected from the semiconductor wafer ω. If the semiconductor wafer ω housed in the chamber 2 is heated to a high temperature, the wafer ω is expanded so as to change a reflection angle θ of the diffracted light. As a result, the position at which the diffracted light 7 is detected by the CCD cameras 4 and 5 is moved in accordance with the change in temperature. In the wafer temperature monitoring apparatus 1, the temperature is measured by detecting the amount of the movement of the position noted above.

However, the conventional wafer temperature monitoring apparatus 1 gives rise to a problem. Specifically, as shown in FIG. 38, films n1 and n2 are formed on the semiconductor wafer ω in accordance with progress of the treatment. Also, if the temperature of the gas within the film formation chamber 2 is changed to form gaseous layers n3 and n4 differing from each other in temperature, the diffracted light 7 is refracted to form a diffracted light 8. As a result, the positions at which the diffracted light beams 7 and 8 reach the CCD camera 4 or 5 are made different from each other by an amount of Δd. Hence, it is impossible to distinguish the temperature change of the semiconductor wafer ω from the change in the film thickness or from the change in the temperature of the ambient gas. It is therefore impossible to monitor accurately the temperature.

It is very important to control the temperature of the wafer surface in the various steps such as the film formation step and the etching step employed in the manufacture of a semiconductor device. In general, a thermocouple is used as a highly reliable temperature measuring means. During the manufacturing process of the semiconductor device, a thermocouple is brought into contact with the back surface of the wafer or with a tool for supporting the wafer so as to perform the temperature control. However, use of a thermocouple gives rise to problems in terms of contamination and life of use. In addition, it is impossible to use a thermocouple for measuring the most important temperature, i.e., temperature on the wafer surface at which chemical reactions are carried out.

On the other hand, a radiation thermometer is a typical example of the known non-contact type thermometer.

However, if the film quality or the film thickness is changed during the process, the radiation thermometer is rendered incapable of measuring the temperature by a change in emissivity and the film interference. It should also be noted that the radiation thermometer is for measuring high temperatures exceeding, in general, 500° C. In other words, the radiation thermometer cannot be used for measuring intermediate and low temperatures lower than 500° C. The thermometer cannot be used in the intermediate and low temperature processes such as the etching process, P-CVD process, and sputtering process.

Recently, a new method for measuring temperature is proposed, in which a pattern of holes formed in a wafer such as contact holes and trenches is illuminated with a laser beam. In this method, a change in the diffraction angle of the diffracted light is detected and the temperature is calculated from the relationship between the diffraction angle and the temperature. In the temperature measuring method of this type, however, it is difficult to form in advance a predetermined pattern of holes in the wafer.

In a film thickness measuring apparatus used in a process apparatus such as a CVD apparatus for formation a thin film on a semiconductor wafer, the waveform before the film formation is taken in for every wafer to be measured. A peak is therefore obtained by using only the waveform of the sample. The film thickness is measured from the peak value thus obtained.

However, the film thickness measuring apparatus of this type gives rise to a problem. Specifically, if the thickness of the underlying film is ununiform in the case of measuring the thickness of a film during or after formation in, for example, a CVD apparatus, the measurement is affected by the ununiform thickness of the underlying film so as to bring about a measuring error.

BRIEF SUMMARY OF THE INVENTION

An object of the first aspect of the present invention is to measure accurately the temperature of an object to be measured, i.e., an object, whose emissivity is unknown or changed.

According to the first aspect of the present invention, the intensity of light radiated from the object is detected, and the intensity of the light reflected from the object when the object is illuminated with light is detected. The reflectivity of the object is obtained on the basis of the detected intensity of the reflected light and a reference intensity of the reflected light. Further, the temperature of the object is obtained on the basis of the emissivity obtained from the reflectivity and the intensity of the radiated light. The particular technique makes it possible to measure accurately the temperature of the object whose emissivity is unknown or changed.

An object of the second aspect of the present invention is to measure accurately the surface temperature of a substrate during the film formation treatment and to measure accurately the film thickness during the film formation treatment.

According to the second aspect of the present invention, it is possible to obtain a sufficient detecting sensitivity by obtaining an integrated value of the radiation intensity by cumulatively adding the intensities of components of the light radiated from the substrate and having various wavelengths. Further, it is possible to perform the measurement accurately because the surface temperature is calculated from the integrated value on the basis of reference data having the temperature and the integrated value correlated each other in advance.

It should also be noted that a relative intensity distribution of radiated light, which is a ratio of a reference intensity distribution of radiated light to a measured intensity distribution of radiated, light, is obtained and compared with a theoretical intensity distribution of radiated light so as to offset the influence given by an optical system. Further, it is possible to cancel the noise generated by, for example, disturbance, making it possible to measure accurately the film thickness without being disturbed by noises or the like. In other words, since it is possible in principle to reduce the noise caused by, for example, disturbance, the measurement is less affected by noises.

An object of the third aspect of the present invention is to measure accurately the temperature of a semiconductor wafer without being affected by the changes in the film thickness and in the temperature of the ambient gas, to measure the thickness of the thin film formed on a wafer, and to measure simultaneously the wafer temperature and the film thickness.

According to the third aspect of the present invention, an image formation point on a sensor is determined by an incident angle of a diffracted light on a lens. Therefore, since the image formation point is not changed even if the incident position of the diffracted light is deviated by, for example, refraction, the temperature can be measured without being affected by refraction caused by a thin film or ambient temperature. Further, since the intensity of the diffracted light is changed depending on the thickness of a thin film formed on a wafer because of the thin film interference, it is possible to measure the thickness of the thin film formed on the wafer on the basis of the intensity of the diffracted light received by a sensor.

An object of the fourth aspect of the present invention is to measure in a non-contact style the temperature of an object by utilizing a diffracted light without formation in advance a predetermined pattern of holes in the object.

According to the fourth aspect of the present invention, the temperature is calculated on the basis of the interval of interference fringes formed by the light rays reflected from a pair of reflecting surfaces of an object, making it unnecessary to form a special pattern and to measure the temperature highly accurately.

An object of the fifth aspect of the present invention is to cancel the influence given by a ununiform thickness of the underlying film so as to improve the accuracy in measuring the film thickness.

According to the fifth aspect of the present invention, the thickness of the uppermost layer of a film during a film formation process is measured in accordance with the thickness of the underlying film, making it possible to measure accurately the film thickness without being affected by a difference in the thickness of the underlying film. It follows that formation of the uppermost layer can be stopped accurately at a target thickness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 22A and 22B show the principle of the temperature measurement performed by the temperature measuring apparatus shown in FIG. 21;

FIG. 23 shows the principle of the temperature measurement performed by the temperature measuring apparatus shown in FIG. 21;

FIGS. 25A to 25C show the movement of the measuring point in the temperature measuring apparatus shown in FIG. 21;

FIGS. 26A and 26B show the movement of the measuring point in the temperature measuring apparatus shown in FIG. 21;

FIGS. 35 to 38 relate to prior art, in which:

FIG. 35 shows changes in the intensity of light radiated from a semiconductor wafer and in the intensity of the reflected light during a film formation within a CVD chamber;

FIG. 36 shows the result of the temperature measurement of a semiconductor wafer using a radiation thermometer;

FIG. 37 shows the construction of a conventional wafer temperature monitoring apparatus; and FIG. 38 shows the influences given by an ambient temperature and a film thickness in the wafer temperature monitoring apparatus shown in FIG. 38.

DETAILED DESCRIPTION OF THE INVENTION

There now follows a description of the present invention with reference to the accompanying drawings.

Figure 1:
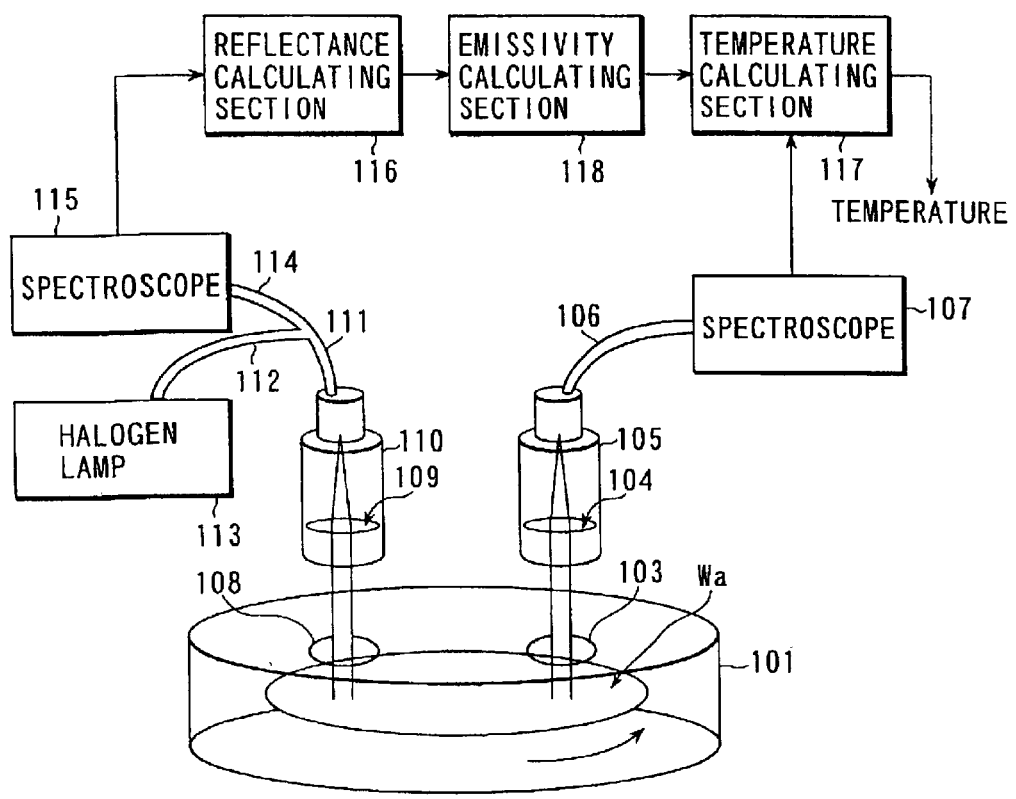
FIG. 1 shows how a temperature measuring apparatus according to a first embodiment of the present invention is used for measuring the temperature of a semiconductor wafer on which a film is being formed within a CVD chamber.
Figure 2:
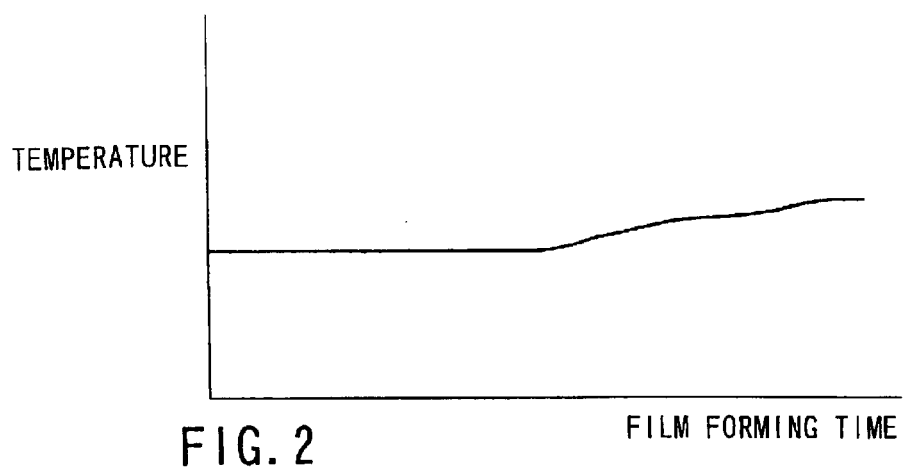
FIG. 2 shows the change with time in the temperature of the semiconductor wafer during the film formation on the wafer within the CVD chamber shown in FIG. 1.

FIGS. 1 and 2 collectively show the first embodiment of the present invention. Specifically, FIG. 1 shows the construction of a temperature measuring apparatus, which is used for measuring the temperature of a semiconductor wafer ωa during film formation on the wafer within a CVD chamber 101.

As shown in the drawing, a film is formed on the semiconductor wafer ωa, which is kept rotated, within the CVD chamber 101. A detecting terminal 105 including a lens 104 is mounted to one view port 103 on the upper surface of the CVD chamber 101. The detecting terminal 105, which is used as a radiation spectrum detecting means for detecting the spectrum of light radiated from the semiconductor wafer ωa, is connected to a spectroscope 107 via an optical fiber 106.

The spectrum of light radiated from the semiconductor wafer ωa and received through the lens 104 and the optical fiber 106 is detected by a photoelectric sensor included in the spectroscope 107 and converted in the spectroscope 107 into a signal denoting the spectrum of the radiated light. Only the spectrum of the light component having a predetermined wavelength, e.g., 800 to 900 nm, which is selected from among the light radiated from the semiconductor wafer ωa, is acquired by the spectroscope 107.

On the other hand, a detecting terminal 110 including a lens 109 is mounted to another view port 108 formed on the upper surface of the CVD chamber 101. The detecting terminal 101, which is used as a reflected light spectrum detecting means for detecting the spectrum of the reflected light when the semiconductor wafer ωa is irradiated with light, is connected to an optical fiber 111, which is branched into an optical fiber 112 and another optical fiber 114. A halogen lamp 113 is connected to the optical fiber 112. Also, a spectroscope 115 is connected to the other optical fiber 114.

The light, reflected from the semiconductor wafer ωa when the wafer ωa is irradiated with light radiated from the halogen lamp 113, is received by the spectroscope 115 through the lens 109 and the optical fibers 111 and 114, and the spectrum of the light reflected from the semiconductor wafer ωa is detected by a photoelectric sensor included in the spectroscope 115 so as to be converted into a reflected light spectrum signal. Only the spectrum of the light component having a predetermined wavelength, e.g., 800 to 900 nm, which is selected from among the light radiated from the halogen lamp and the light reflected from the semiconductor wafer ωa, is acquired by the spectroscope 115, as in the spectroscope 107.

The reflected light spectrum signal generated from the spectroscope 115 is supplied to a reflectance calculating section 116, to obtain a ratio of the reflected light spectrum to a reference reflected light spectrum stored in advance in the reflectance calculating section 116. To be more specific, when a reference semiconductor wafer (bare silicon) is used in place of the semiconductor wafer ωa, the reference semiconductor wafer is irradiated with the light radiated from the halogen lamp 113 and the light reflected from the reference semiconductor wafer is received by the spectroscope 115 through the lens 109 and the optical fibers 111 and 114 so as to obtain a spectrum of the light reflected from the reference semiconductor wafer. The reflected light spectrum thus obtained is stored in advance in the reflectance calculating section 116, as described above. The reflectance of the semiconductor wafer ωa is obtained within the reflectance calculating section 116, from the ratio of the spectrum of the light reflected from the semiconductor wafer ωa to the spectrum of the light reflected from the reference semiconductor wafer.

The reflectance acquired in the reflectance calculating section 116 is supplied to a temperature calculating section 117 which includes an emission rate calculating section 118. The emission rate is obtained by an equation (1) in the emission rate calculating section 118 from the reflectance obtained in the reflectance calculating section 116:

$$E = 1 - R - T \tag{1}$$

where, E represents the emission rate, R represents the reflectance, and T represents the transmittance.

Then, the temperature of the semiconductor wafer ωa is obtained by an equation (2) based on the emission rate E thus obtained and the spectrum of the radiated light detected by the spectroscope 107:

$$\text{Temperature} = \sqrt[4]{(1/\sigma) \int E \cdot Rs \, d\lambda} \tag{2}$$

where, σ represents the Stefan-Boltzmann constant, E represents the emission rate, Rs represents the radiation spectrum, and λ represents the wavelength.

Let us describe the operation of the apparatus constructed as described above.

Specifically, during the film formation on the semiconductor wafer ωa which is kept rotated within the CVD chamber 101, the light radiated from the semiconductor wafer ωa is guided to the spectroscope 107 via the lens 104 of the detecting terminal 105 connected to the view port 103 and the optical fiber 106. Only the spectrum of the light component having a wavelength of, for example, 800 to 900 nm, which is selected from among the light received by the spectroscope 107, is acquired in the spectroscope 107 so as to be converted by the photoelectric sensor into a radiated light spectrum signal representing the spectrum of the light radiated from the semiconductor wafer ωa.

On the other hand, the light radiated from the halogen lamp 113 is guided through the optical fibers 112 and 111 and, then, the surface of the semiconductor wafer ωa arranged within the CVD chamber 101 is irradiated with the light radiated from the halogen lamp through the lens 109 included in the detecting terminal 110. Further, the light reflected from the semiconductor wafer ωa is guided to the spectroscope 115 through the lens 109 of the detecting terminal 110 connected to the view port 108 and through the optical fibers 111 and 114.

Only the spectrum of the light component having a wavelength of, for example, 800 to 900 nm, which is selected from among the light reflected from the semiconductor wafer ωa, is acquired in the spectroscope 115 and converted by the photoelectric sensor into a reflected light spectrum signal denoting the spectrum of the light reflected from the semiconductor wafer ωa.

Figure 35:
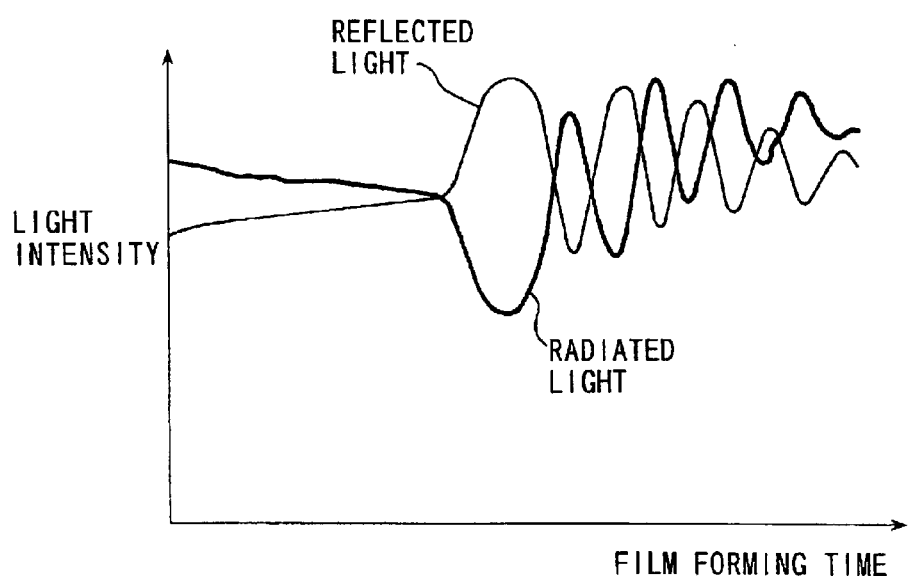
Figure 36:
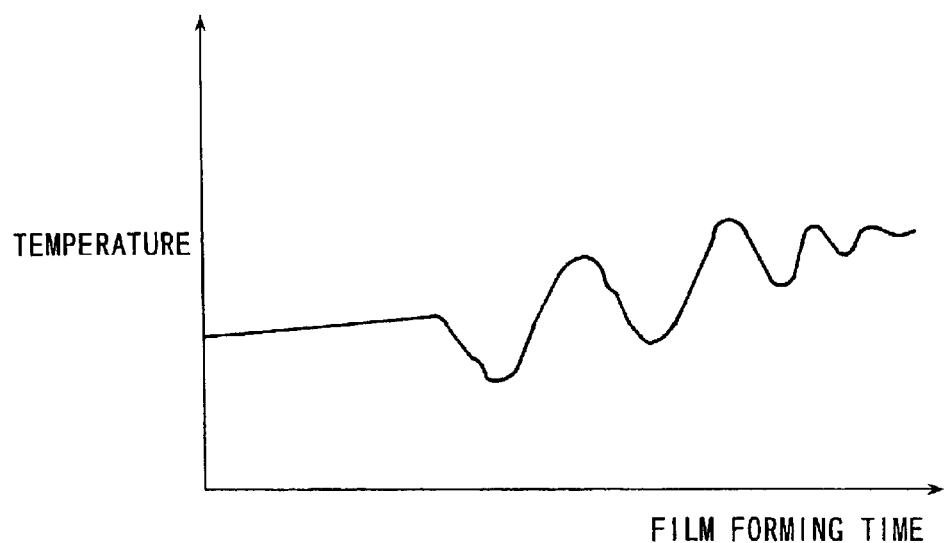
Figure 37:
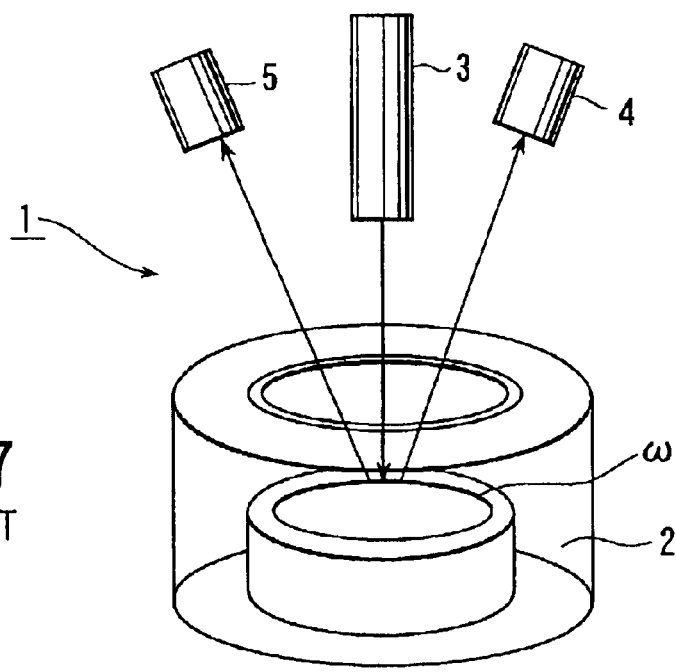
Figure 38:
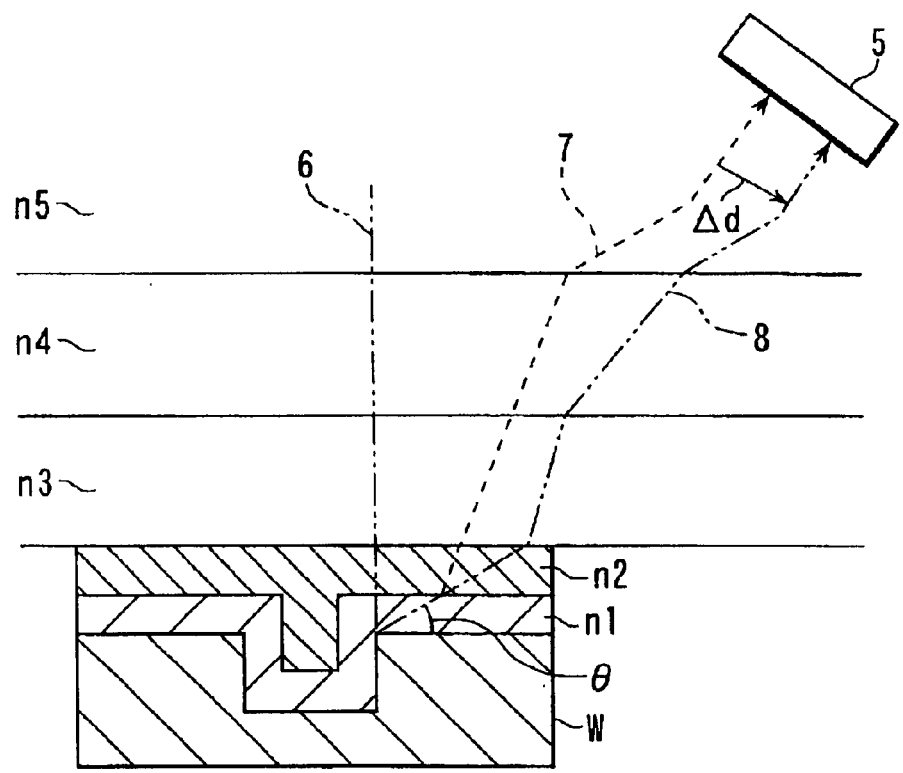

FIG. 35 shows changes in the radiated light spectrum, which is obtained by integrating the spectrum signal of the radiated light having a wavelength of 800 to 900 nm, said signal being acquired in the spectroscope 107, and in the reflected light spectrum, which is obtained by integrating the spectrum signal of the reflected light having a wavelength of 800 to 900 nm, said signal being acquired in the spectroscope 115.

The reflected light spectrum signal generated from the spectroscope 115 is supplied to the reflectance calculating section 116. The reflectance of the semiconductor wafer ωa is obtained from a ratio of the reflected light spectrum within the spectroscope 115 to the reflected light spectrum which is stored in advance in the reflectance calculating section 116 and is detected in the case of using a reference semiconductor wafer. It should be noted that, where the semiconductor wafer ωa is a silicon wafer, the transmittance of light having a wavelength of 800 to 900 nm is 0, with the result that the emission rate of the semiconductor wafer ωa is obtained on the basis of the reflectance, as apparent from the equation (1).

The emission rate is acquired in the temperature calculating section 117 by an equation (1) from the reflectance obtained in the reflectance calculating section 116. Further, the temperature of the semiconductor wafer ωa is acquired in the temperature calculating section 117 by an equation (2) based on the emission rate thus obtained and the radiated light spectrum detected by the spectroscope 107. FIG. 2 shows changes with time in the temperature of the semiconductor wafer ωa during a film formation on the semiconductor wafer ωa within the CVD chamber 101, said temperature being measured on a real time basis.

As described above, in the first embodiment of the present invention, the spectrum of the light radiated from the semiconductor wafer ωa is detected. Also detected is the spectrum of the light reflected from the semiconductor wafer ωa when the semiconductor wafer ωa is irradiated with light. The reflectance of the semiconductor wafer ωa is obtained on the basis of the reflected light spectrum thus detected and a reference reflected light spectrum. Further, the temperature of the semiconductor wafer ωa is obtained on the basis of the reflectance thus obtained and the semiconductor wafer ωa. It follows that, even if the radiated light spectrum is changed by a thin film interference to depict a sine wave, the temperature of the semiconductor wafer ωa can be measured accurately on the real time basis without being affected by the sine wave-like change in the spectrum of the radiated light, in spite of the fact that the temperature of the semiconductor wafer ωa is being changed as in the process of forming a film on the semiconductor wafer ωa within the CVD chamber 101. It should also be noted that the temperature of a object, whose emission rate is unknown, other than the semiconductor wafer ωa can also be measured accurately in the first embodiment of the present invention.

Figure 3:
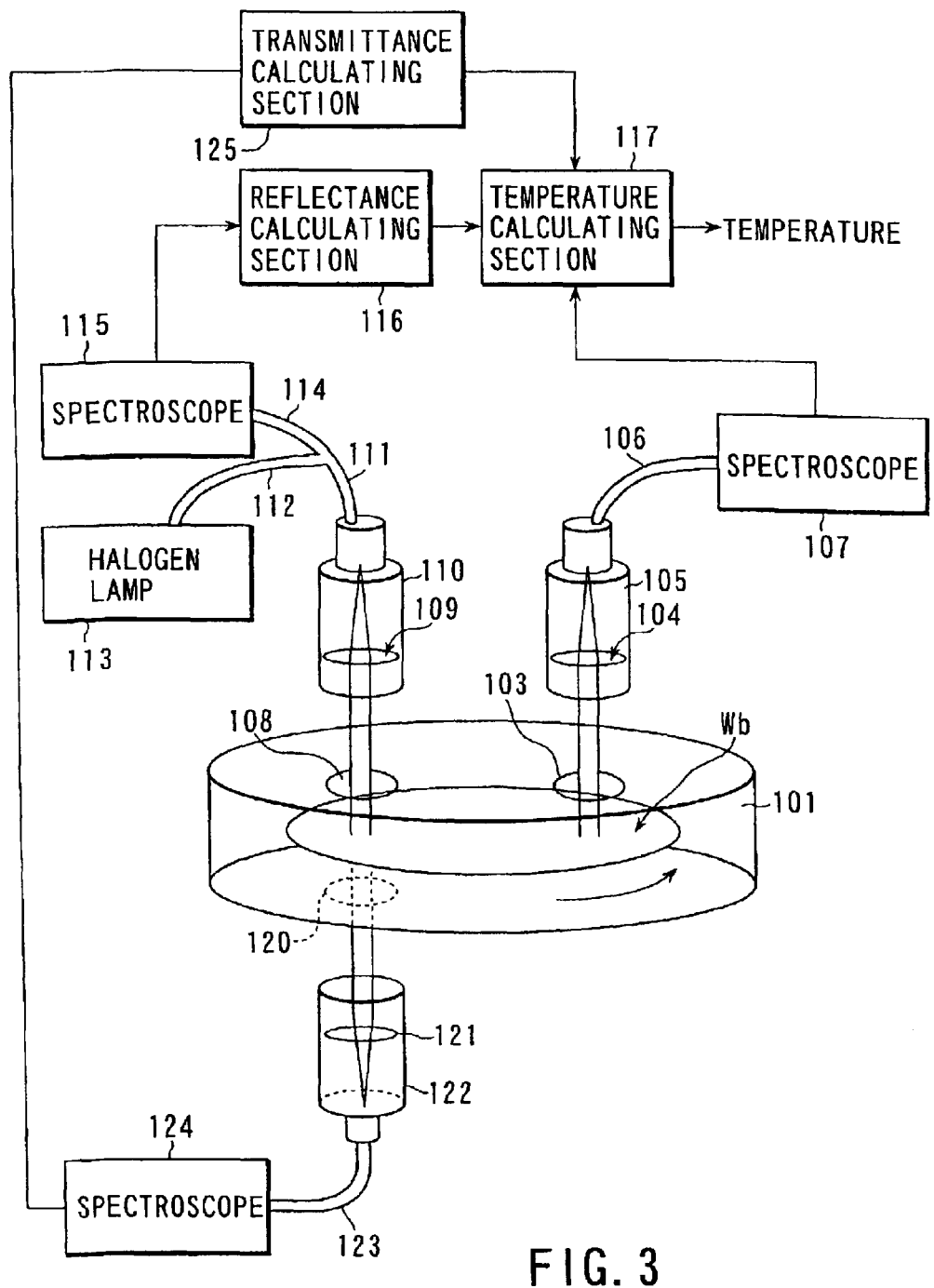
FIG. 3 shows how a temperature measuring apparatus according to a second embodiment of the present invention is used for measuring the temperature of a semiconductor wafer on which a film is being formed within a CVD chamber.

Let us describe a temperature measuring apparatus according to a second embodiment of the present invention with reference to FIG. 3. Those members of the apparatus which are common with the members of the apparatus shown in FIG. 1 are denoted by the same reference numerals so as to omit an overlapping description. The temperature measuring apparatus shown in FIG. 3 is used for measuring the temperature of a light-transmitting semiconductor wafer ωb on which a film is being formed within the CVD chamber 101.

As shown in FIG. 3, a detecting terminal 122 including a lens 121 is mounted to a view port 120 on the lower surface of the CVD chamber 101 as a transmitting light spectrum detecting means for detecting the spectrum of the light transmitted through the light-transmitting semiconductor wafer ωb. Also, a spectroscope 124 is connected to the detecting terminal 122 through an optical fiber 123.

The spectrum of the light transmitted through the semiconductor wafer ωb is detected by a photoelectric sensor included in the spectroscope 124 and, then, converted within the spectroscope 124 into a signal denoting the spectrum of the transmitted light. Also, only the spectrum of the light component having a wavelength of, for example, 800 to 900 nm, which is selected from among the light transmitted through the semiconductor wafer ωb, is obtained in the spectroscope 124.

The transmitted light spectrum signal generated from the spectroscope 124 is supplied to a transmittance calculating section 125 to obtain a ratio of the transmitted light spectrum to a reference transmitted light spectrum stored in advance in the transmittance calculating section 125. To be more specific, when a reference semiconductor wafer (bare silicon) is used in place of the semiconductor wafer ωb, the reference semiconductor wafer is irradiated with the light radiated from the halogen lamp 113 and the light transmitted through the reference semiconductor wafer is received by the spectroscope 124 through the lens 121 and the optical fibers 123 so as to obtain a spectrum of the light transmitted through the reference semiconductor wafer. The transmitted light spectrum thus obtained is stored in advance in the transmittance calculating section 125, as described above. The transmittance of the semiconductor wafer ωb is obtained within the transmittance calculating section 125 from the ratio of the spectrum of the light transmitted through the semiconductor wafer ωb to the spectrum of the light transmitted through from the reference semiconductor wafer.

The temperature measuring apparatus of the second embodiment, which is constructed as described above, is operated as follows. Specifically, during the film formation on the semiconductor wafer ωa which is kept rotated within the CVD chamber 101, the light radiated from the semiconductor wafer ωa is guided to the spectroscope 107 via the optical fiber 106, as in the apparatus of the first embodiment. Only the spectrum of the light component having a wavelength of, for example, 800 to 900 nm, which is selected from among the light received by the spectroscope 107, is obtained in the spectroscope 107 so as to be converted into a radiated light spectrum signal representing the spectrum of the light radiated from the semiconductor wafer ωa.

On the other hand, the light radiated from the halogen lamp 113 is guided through the optical fibers 112 and 111 and, then, the surface of the semiconductor wafer ωa is irradiated with the light radiated from the halogen lamp 113. Further, the light reflected from the semiconductor wafer ωa is guided again to the spectroscope 115 through the optical fibers 111 and 114.

Only the spectrum of the light component having a wavelength of, for example, 800 to 900 nm, which is selected from among the light reflected from the semiconductor wafer ωa, is acquired in the spectroscope 115 and converted into a reflected light spectrum signal denoting the spectrum of the light reflected from the semiconductor wafer ωa.

The reflected light spectrum signal generated from the spectroscope 115 is supplied to the reflectance calculating section 116 so as to obtain the reflectance of the semiconductor wafer ωb from a ratio of the reflected light spectrum supplied to the reflectance calculating section 116 to a reflected light spectrum which is detected in the case of using a reference semiconductor wafer stored in advance.

Further, the transmitted light spectrum signal generated from the spectroscope 124 is supplied to the transmittance calculating section 125 to obtain the transmittance of the semiconductor wafer ωb on the basis of a ratio of the transmitted light spectrum supplied to the section 125 to a transmitted light spectrum stored in advance in the transmittance calculating section 125, which is detected in the case of using a reference semiconductor wafer.

Then, the emission rate is obtained by an equation (1) based on the reflectance obtained in the reflectance calculating section 116 and the transmittance calculated in the transmittance calculating section 125. Further, the temperature of the semiconductor wafer ωa is obtained in the temperature calculating section by an equation (2) based on the emission rate thus obtained and the radiated light spectrum detected by the spectroscope 107.

As described above, in the temperature measuring apparatus according to the second embodiment of the present invention, the transmitted light spectrum when the semiconductor wafer ωb is irradiated with light is detected so as to obtain the transmittance of the semiconductor wafer ωb. Then, the temperature of the semiconductor wafer ωb is obtained on the basis of the transmittance thus obtained as well as the reflectance and the radiated light spectrum. It follows that the temperature of the semiconductor wafer ωa can be measured accurately on the real time basis during film formation on the wafer ωa within the CVD chamber 101 as in the apparatus of the first embodiment, even if the semiconductor wafer ωb transmits light. It should also be noted that the temperature measuring apparatus of the second embodiment permits measuring the temperature of a object, whose emission rate and transmittance are unknown, other than the semiconductor wafer ωa.

Figure 4:
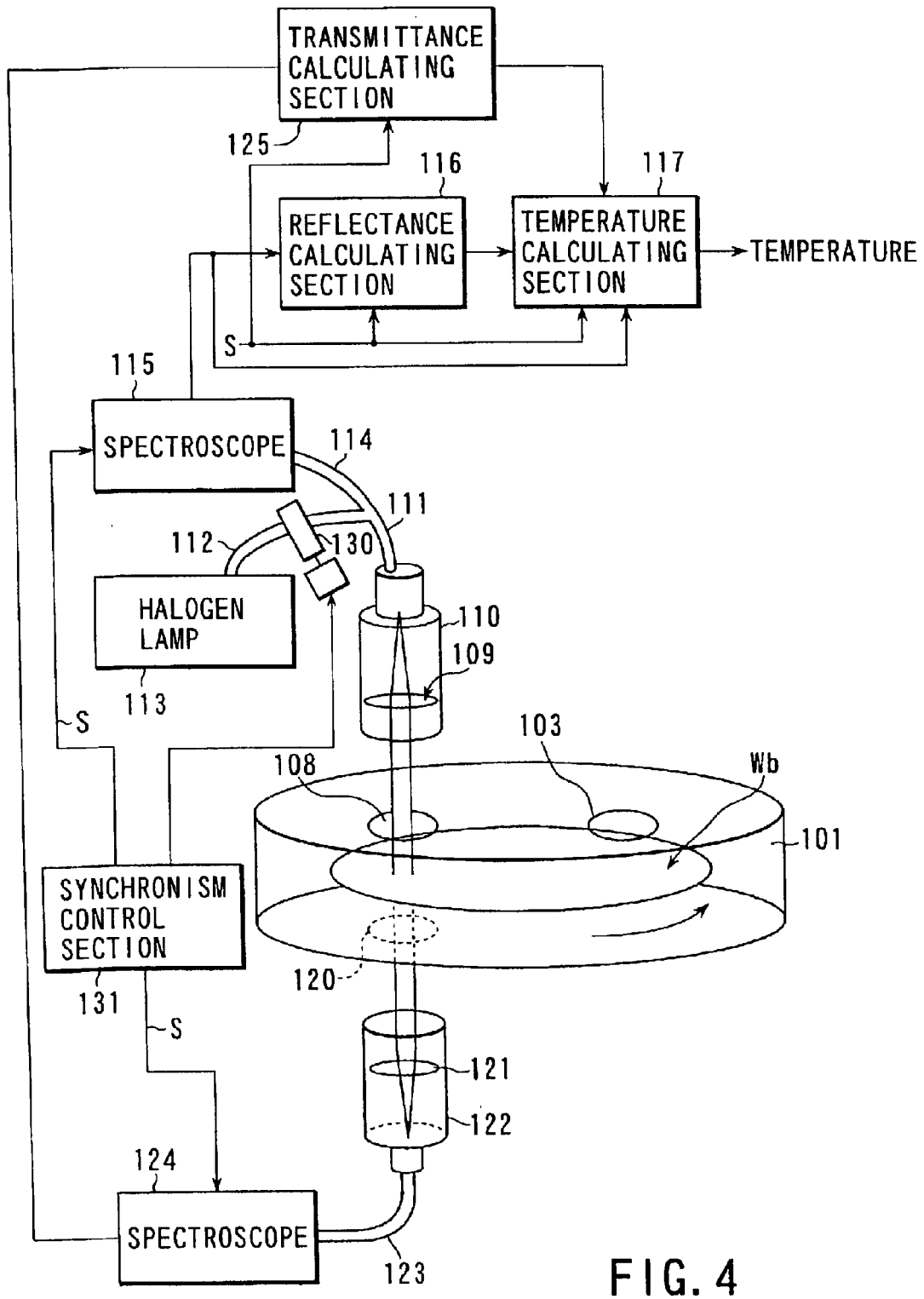
FIG. 4 shows how a temperature measuring apparatus according to a third embodiment of the present invention is used for measuring the temperature of a semiconductor wafer on which a film is being formed within a CVD chamber.

FIG. 4 shows the construction of a temperature measuring apparatus according to a third embodiment of the present invention. Those members of the apparatus which are common with the members of the apparatus shown in FIG. 3 are denoted by the same reference numerals so as to avoid an overlapping description. FIG. 4 shows that the apparatus of the third embodiment is used for measuring the temperature of a semiconductor wafer during film formation on the wafer within a CVD chamber.

As shown in FIG. 4, an on-off mechanism 130 for performing an on (closed)-off (open) operation of light such as a chopper or a shutter is mounted to the optical fiber 112 connected to the halogen lamp,113. The on-off mechanism 130 serves to turn the light radiated from the halogen lamp 113 on and off at a predetermined interval under the control of a synchronism control section 131 which delivers a synchronous signal s to each of the spectroscopes 115 and 124.

The spectroscope 115 serves to detect the spectrum of the light radiated from the semiconductor wafer ωb when the on-off mechanism 130 is turned on so as to shield the light radiated from the halogen lamp 113 and also serves to detect the spectrum of the light reflected from the semiconductor wafer ωb when the on-off mechanism 130 is turned off so as to permit the semiconductor wafer ωb to be irradiated with light radiated from the halogen lamp 113.

On the other hand, the spectroscope 124 serves to detect the spectrum of the light transmitted through the semiconductor wafer ωb when the on-off mechanism 130 is turned off so as to permit the semiconductor wafer ωb to be irradiated with light radiated from the halogen lamp 113.

The reflectance calculating section 116 receives the synchronous signal s delivered from the synchronism control section 131. The reflected light spectrum signal generated from the spectroscope 115 is also supplied to the reflectance calculating section 116 when the on-off mechanism 130 is turned off so as to allow the reflectance calculating section 116 to obtain the reflectance of the semiconductor wafer ωb based on a ratio of the reflected light spectrum supplied to the section 116 to a reflected light spectrum stored in advance in the section 116, which is detected in the case of using a reference semiconductor wafer.

The transmittance calculating section 125 also receives the synchronous signal s delivered from the synchronism control section 131. The transmitted light spectrum signal generated from the spectroscope 124 is also supplied to the transmittance calculating section 125 when the on-off mechanism 130 is turned off so as to obtain the transmittance of the semiconductor wafer ωb based on a ratio of the transmitted light spectrum supplied to the section 125 to a transmitted light spectrum stored in advance in the section 125, which is detected in the case of using a reference semiconductor wafer.

The emission rate is obtained in the temperature calculating section 117 by equation (1) from the reflectance obtained in the reflectance calculating section 116 and the transmittance obtained in the transmittance calculating section 125. Further, the temperature of the semiconductor wafer ωa is obtained in the temperature calculating section 117 by equation (2) based on the emission rate thus obtained and the radiated light spectrum detected by the spectroscope 115 when the on-off mechanism 130 is turned on upon receipt of a synchronous signal delivered from the synchronism control section 131.

There now follows a description of the operation of the temperature measuring apparatus constructed as described above.

During film formation on the semiconductor wafer ωa which is rotated within the CVD chamber 101, the halogen lamp 113 radiates light and the on-off mechanism 130 turns the light radiated from the halogen lamp 113 on and off at a predetermined interval under the control of the synchronism control section 131. When the on-off mechanism 130 is turned on to shield the light radiated from the halogen lamp 113, the light radiated from the semiconductor wafer ωa is guided to the spectroscope 115 through the optical fibers 111 and 114. Only the spectrum of the light component having a wavelength of, for example, 800 to 900 nm, which is selected from among the light radiated from the semiconductor wafer ωa, is obtained in the spectroscope 115 so as to be converted into a signal denoting the spectrum of the light radiated from the semiconductor wafer ωa.

On the other hand, when the on-off mechanism 130 is turned off to permit the surface of the semiconductor wafer ωa to be irradiated with the light radiated from the halogen lamp 113 and guided to the semiconductor wafer ωa through the optical fibers 112 and 111, the light reflected from the surface of the semiconductor wafer ωa is guided to the spectroscope 115 through the optical fibers 111 and 114. Only the spectrum of the light component having a wavelength of, for example, 800 to 900 nm, which is selected from among the light reflected from the semiconductor wafer ωa, is obtained in the spectroscope 115 so as to be converted into a signal denoting the spectrum of the light reflected from the semiconductor wafer ωa. In this step, the reflected light spectrum signal generated from the spectroscope 115 when the on-off mechanism 130 is turned off, upon receipt of a synchronous signal delivered from the synchronism control section 131, is supplied to the reflectance calculating section 116. As a result, the reflectance of the semiconductor wafer ωb is obtained in the reflectance calculating section 116 from a ratio of the reflected light spectrum supplied to the section 116 to a reflected light spectrum stored in advance in the section 116, which is detected in the case of using a reference semiconductor wafer.

At the same time the light, transmitted through the semiconductor wafer ωa when the on-off mechanism 130 is turned off to permit the surface of the semiconductor wafer ωa to be irradiated with the light radiated from the halogen lamp 113, is guided to the spectroscope 124 through the optical fiber 123. Only the spectrum of the light having a wavelength of, for example, 800 to 900 nm, which is selected from among the light transmitted through the semiconductor wafer ωa, is obtained in the spectroscope 124 so as to be converted into a signal denoting the spectrum of the light transmitted through the semiconductor wafer ωa.

In this step, the transmitted light spectrum signal generated from the spectroscope 124 when the on-off mechanism 130 is turned on upon receipt of a synchronous signal delivered from the synchronism control section 131 is supplied to the transmittance calculating section 125. As a result, the transmittance of the semiconductor wafer ωb is obtained from a ratio of the transmitted light spectrum supplied to the transmittance calculating section 125 to a transmitted light spectrum stored in advance in the section 125, which is detected in the case of using a reference semiconductor wafer.

Then, the emission rate is obtained in the temperature calculating section 117 by equation (1) from the reflectance obtained in the reflectance calculating section 116 and the transmittance obtained in the transmittance calculating section 125. Further, the temperature of the semiconductor wafer ωa is obtained in the temperature calculating section 117 by an equation (2) on the basis of the emission rate thus obtained and the radiated light spectrum detected by the spectroscope 115 when the on-off mechanism 130 is turned on upon receipt of a synchronous signal s delivered from the synchronism control section 131.

As described above, in the temperature measuring apparatus according to the third embodiment of the present invention, the light radiated from the halogen lamp 113 is turned on or off by the on-off mechanism 130 so as to permit the reflected light and the radiated light from the semiconductor wafer ωb to be alternately received in synchronism with the on-off function of the light radiated from the halogen lamp 113. The temperature of the semiconductor wafer ωb is obtained on the basis of the reflected light spectrum and the radiated light spectrum. Needless to say, the apparatus according to the third embodiment of the present invention produces effects similar to those produced by the apparatus of the second embodiment. In addition, the apparatus of the third embodiment can be simplified, compared with the apparatus of the second embodiment, because the detecting terminal 105, the optical fiber 106 and the spectroscope 107, which are included in the apparatus of the second embodiment, need not be used in the apparatus of the third embodiment.

The above description of the third embodiment covers the case where the temperature measuring apparatus is used for measuring the temperature of the semiconductor wafer ωb which transmits light. If the apparatus of the third embodiment is used for measuring the temperature of the semiconductor wafer ωa having a light transmittance of substantially 0, e.g., less than 0.01%, it is possible to further simplify the apparatus by omitting the detecting terminal 122, the optical fiber 123, the spectroscope 124 and the transmittance calculating section 125.

Figure 5:
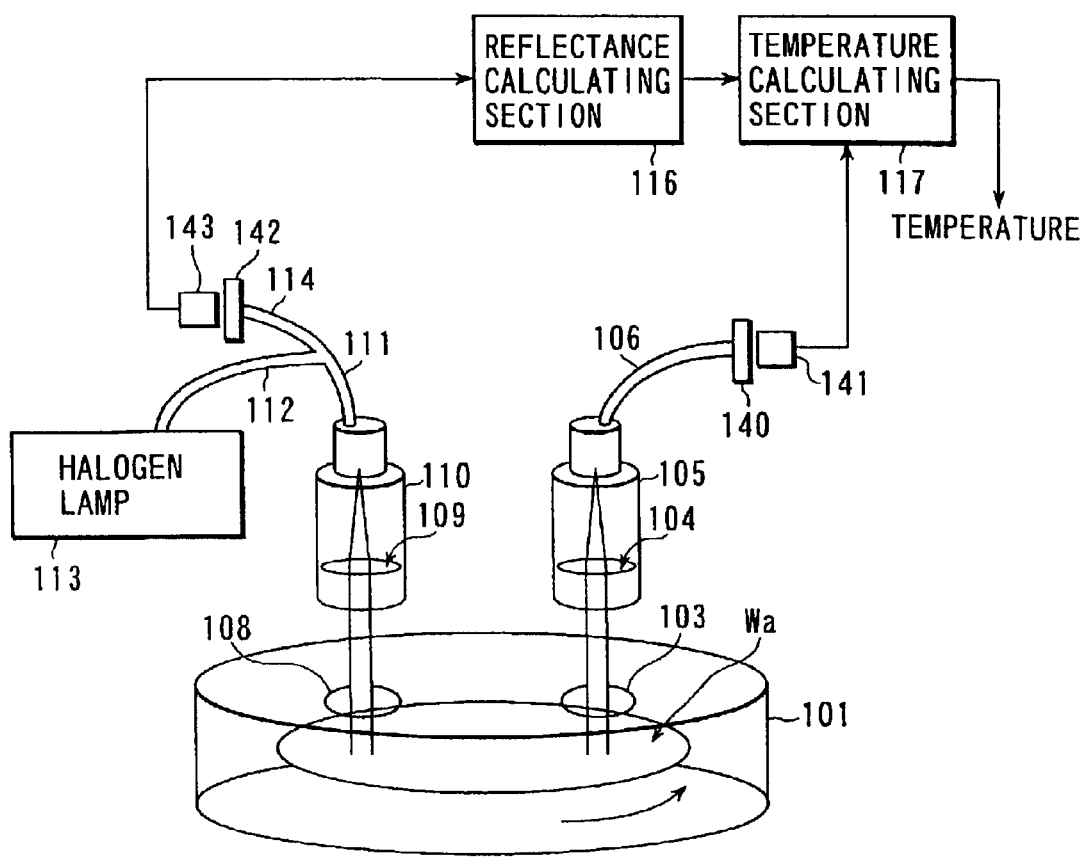
FIG. 5 shows how a temperature measuring apparatus according to a fourth embodiment of the present invention is used for measuring the temperature of a semiconductor wafer on which a film is being formed within a CVD chamber.

Let us describe a temperature measuring apparatus according to a fourth embodiment of the present invention with reference to FIG. 5. Those members of the apparatus shown in FIG. 5 which are common with the members of the apparatus shown in FIG. 1 are denoted by the same reference numerals so as to avoid an overlapping description. The apparatus shown in FIG. 5 is used for measuring the temperature of the semiconductor wafer ωa during film formation on the wafer ωa within the CVD chamber.

In the apparatus shown in FIG. 5, a device consisting of an interference filter 140 and a photoelectric sensor 141 is used in place of the spectroscope 107 shown in FIG. 1. Also, a device consisting of an interference filter 142 and a photoelectric sensor 143 is used in place of the spectroscope 115 shown in FIG. 1. Each of these interference filters 140 and 142 selectively transmits the light component having a wavelength of, for example, 800 to 900 nm.

There now follows a description of the operation of the temperature measuring apparatus of the construction described above.

Specifically, the light radiated from the semiconductor wafer ωa during film formation thereon within the CVD chamber 101 is guided to the interference filter 140 through the optical fiber 106. The interference filter 140 selectively transmits the light component having a wavelength of, for example, 800 to 900 nm, which is selected from among the light radiated from the semiconductor wafer ωa. The light component transmitted through the interference filter 140 is converted by the photoelectric sensor 141 into a signal denoting the intensity of the light radiated from the semiconductor wafer ωa.

On the other hand, the light radiated from the halogen lamp 113 is guided by the optical fibers 112 and 111 so as to have the surface of the semiconductor wafer ωa irradiated with the light radiated from the halogen lamp 113. The light reflected from the semiconductor wafer ωa is guided to the interference filter 142 through the optical fibers 111 and 114. The interference filter 142 selectively transmits the light component having a wavelength of, for example, 800 to 900 nm, which is selected from among the light reflected from the semiconductor wafer ωa. The light component transmitted through the interference filter 142 is converted by the photoelectric sensor 143 into a signal denoting the intensity of the light reflected from the semiconductor wafer ωa.

The reflected light intensity signal generated from the photoelectric sensor 143 is supplied to the reflectance calculating section 116. The reflectance of the semiconductor wafer ωa is obtained in the reflectance calculating section 116 from a ratio of the reflected light intensity supplied to the section 116 to a reflected light intensity stored in advance in the section 116, which is detected in the case of using a reference semiconductor wafer.

The emission rate is obtained in the temperature calculating section 117 by an equation (1) from the reflectance obtained in the reflectance calculating section 116. Further, the temperature of the semiconductor wafer ωa is obtained in the temperature calculating section 117 by an equation (2) based on the emission rate thus obtained and the radiated light intensity signal generated from the photoelectric sensor 141.

Needless to say, the temperature measuring apparatus according to the fourth embodiment produces the effects similar to those produced by the apparatus of the first embodiment. In addition, the apparatus of the fourth embodiment can be manufactured at a lower cost because the interference filters 140 and 142 used in the fourth embodiment are cheaper than the spectroscopes 107 and 115 used in the apparatus of the first embodiment.

To reiterate, the interference filters 140 and 142 are used in the apparatus of the fourth embodiment in place of the spectroscopes 107 and 115. Likewise, interference filters can be used in each of the second and third embodiments in place of the spectroscopes 107, 115 and 124.

As described above, the temperature measuring method and the temperature measuring apparatus according to the first to fourth embodiments of the present invention make it possible to measure accurately the temperature of a object whose emission rate is unknown or whose emission rate is changed.

Figure 6:
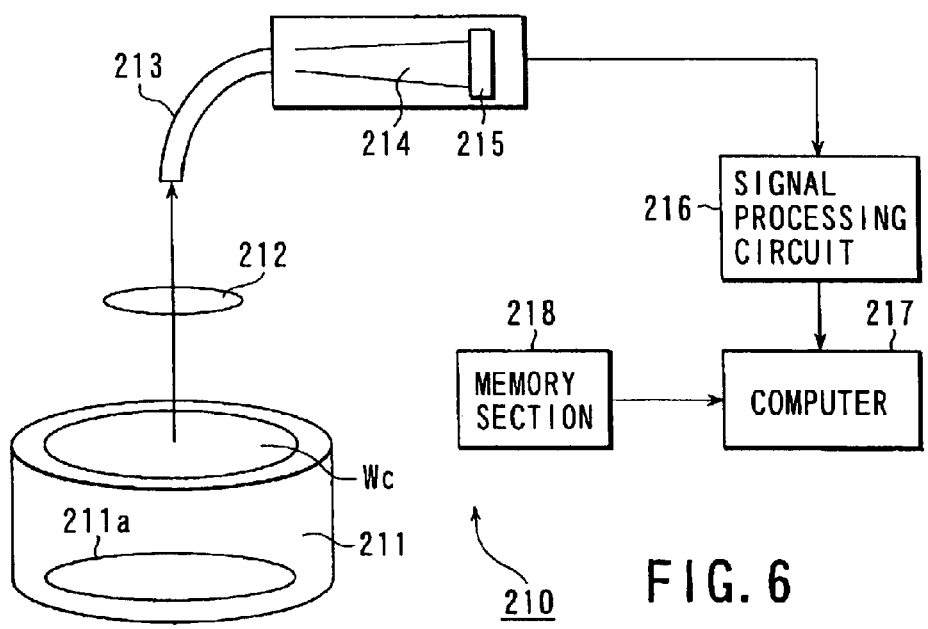
FIG. 6 shows the construction of a surface temperature measuring apparatus according to a fifth embodiment of the present invention.

FIG. 6 shows the construction of a surface temperature measuring apparatus 210 according to a fifth embodiment of the present invention.

As shown in the drawing, the surface temperature measuring apparatus 210 comprises a stage 211 for holding a semiconductor wafer ωc, a lens 212 aligned with the wafer ωc to converge the light radiated from the wafer ωc, an optical fiber 213 having one end aligned with the lens 212 for guiding the radiated light collected by the lens 212, a spectroscope 214 aligned with the other end of the optical fiber 213 for subjecting the light having a predetermined range of wavelength to a spectroscopic analysis for every predetermined wavelength step, an array sensor 215 mounted to the spectroscope 214 for detecting the intensity of the spectroscopically analyzed light for every wavelength step so as to generate the light intensity as an integrated value, a signal processing circuit 216 for collecting the signal generated from the array sensor 215 so as to subject the collected signal to an A/D conversion, and a computer 217 receiving the output signal generated from the signal processing circuit 216 for calculating the intensity distribution of the radiated light based on the integrated value of the light intensity. On the other hand, a memory section 218 storing a table consisting of plural reference data is connected to computer 217. Incidentally, a heater 211a is mounted under the wafer ωc.

In the surface temperature measuring apparatus 210 of the construction described above, the surface temperature of a film formed on a wafer ωc during a film forming process is measured as follows. Specifically, the light radiated from the surface of the wafer ωc disposed on the wafer stage 211 and heated by the heater 211a is converged by the lens 212 and, then, guided to the spectroscope 214 through the optical fiber 213. In the spectroscope 214, the light spectroscopically analyzed for every predetermined wavelength step is guided to the array sensor 215. In the array sensor 215, the integrated value of the light intensity of a predetermined wavelength step width is detected for every sensor. The integrated value is subjected to an A/D conversion in the signal processing circuit 216, and the A/D converted signal is supplied to the computer 217.

In the computer 217, the wavelength distribution Q (d, t, λ) of the radiated light is calculated on the basis of the integrated value. Further, a whole wavelength intensity integrated value G (d, t)=∫Q(d, t, λ)dλ, in which the range of integration is used as the whole wavelength, is calculated on the basis of the wavelength distribution Q (d, t, λ).

The whole wavelength intensity integrated value G is standardized on the basis of the table stored in advance in the memory section 218 depending on the material, construction and thickness of the film.

Figure 7A:
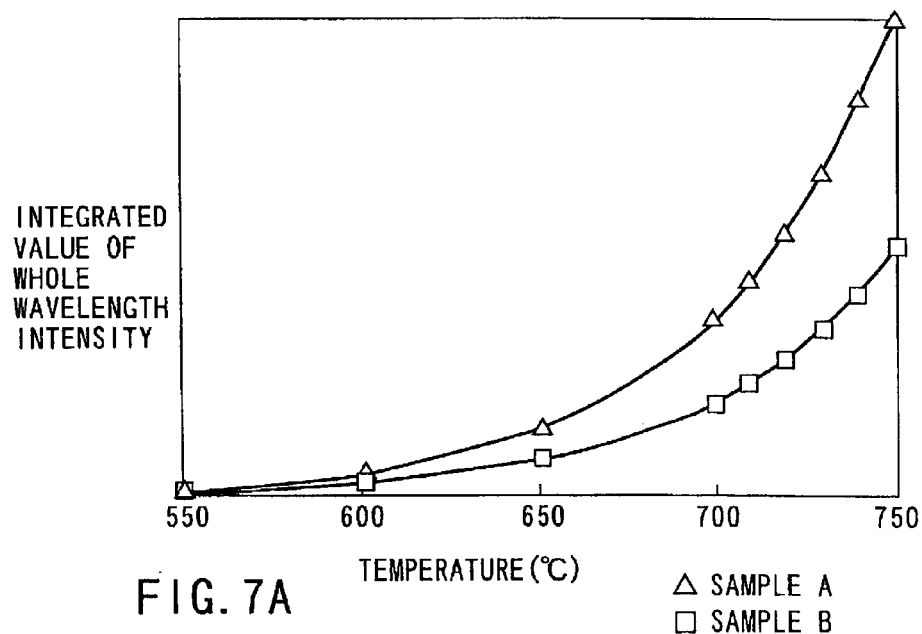
FIGS. 7A and 7B are graphs showing the relationship between temperature and light intensity, both detected by the surface temperature measuring apparatus shown in FIG. 6.

There now follows a description of the table. Specifically, the emission rate is changed depending on the material, construction and thickness of the film. Therefore, the relation of the whole wavelength intensity integrated value G to the surface temperature of the object is represented by a curve as shown in, for example, FIG. 7A, said curve denoting different absolute amounts of the integrated value. Suppose, for example, the standardization with the integrated value $G_{ref}$=G (d, τ) at τK (Kelvin temperature). In this case, Gk=G(d, t)/$G_{ref}$.

Figure 7B:
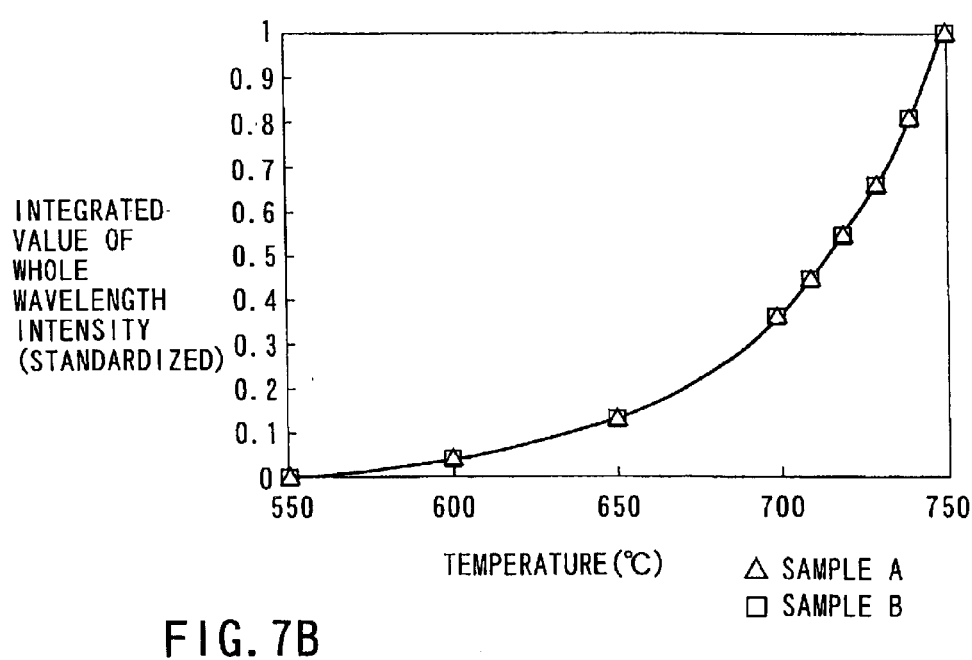

Incidentally, the reference data $G_{ref}$ is corrected in advance with τK by, for example, a contact method depending on the material, construction and thickness of the film. In this case, the standard integrated value Gk depicts the same curve relative to the temperature independent of the material, construction and thickness of the film, as shown in FIG. 7B. It follows that, if it is possible to present theoretically the standard integrated value characteristics, the surface temperature of the target film can be estimated from the value of the standard integrated value Gk. In other words, the surface temperature of a film of every material, construction and thickness can be obtained by acquiring in advance the reference value $G_{ref}$ in accordance with the material, construction and thickness of the film so as to prepare a table.

On the other hand, the blackbody radiation theory indicates that the radiated light distribution of a blackbody can be given by:

$$E = C1/\lambda^5/(\exp(C2/\lambda\tau)-1)$$

where C1 represents a first radiation constant ($2\pi hc^2$), C2 represents a second radiation constant (ch/k), λ represents a wavelength, h represents the Planck's constant, k represents the Boltzmann constant, and c represents the speed of light.

If E is integrated over the whole wavelength, the so-called Stefan-Boltzmann law of:

Esb=$\sigma\tau^4$, where σ represents the Stefan-Boltzmann constant ($2\tau^5 \cdot k^4/15c^3/h^3$) is obtained If standardized by the theoretical integrated value Esb(τK) at τK, a standardized theoretical integrated value Ek=Esb/Esb(τK) is obtained. Ek is proportional to the fourth power of the surface temperature.

Figure 8:
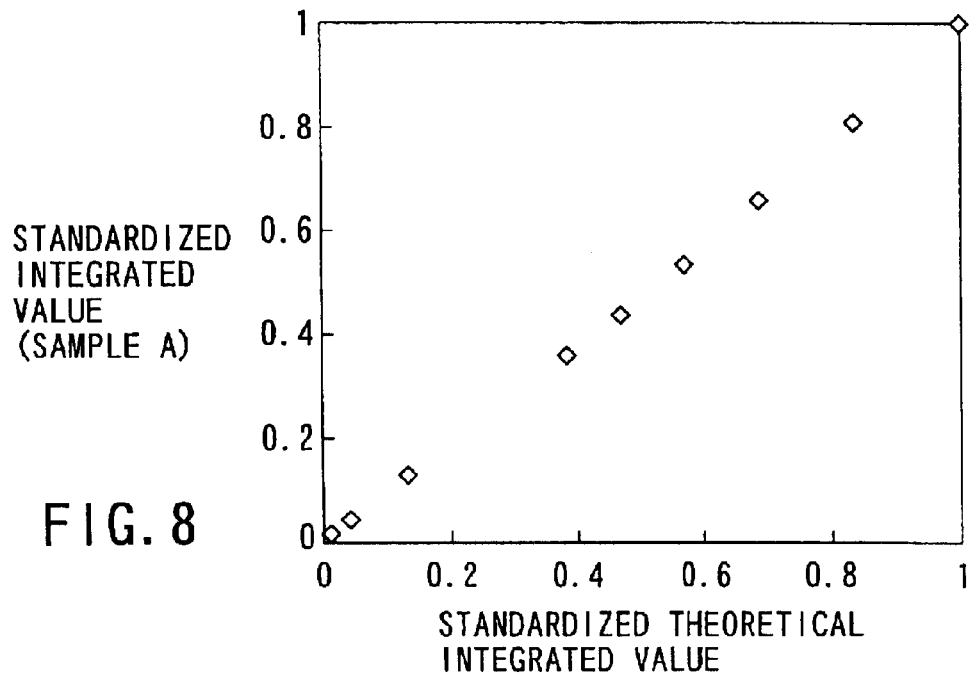
FIG. 8 is a graph showing the relationship between the theoretical light intensity and the light intensity actually measured by the surface temperature measuring apparatus shown in FIG. 6.

As shown in FIG. 8, the standard integrated value Wk calculated from the actually measured values well conforms with the standard theoretical integrated value Ek derived from the blackbody radiation theory, making it possible to estimate the surface temperature of the film corresponding to the standard integrated value Wk from the theoretical curve Ek.

The surface temperature measuring apparatus 210 of the fifth embodiment described above permits measuring, highly accurately, the surface temperature of the wafer ωc during the film forming process. Also, the surface temperature can be measured highly accurately even if the material, construction and thickness of the wafer ωc are changed.

In the fifth embodiment described above, the whole wavelength region is integrated. However, the scope of integration can be limited to a predetermined wavelength range. To be more specific, the actual radiation spectroscopy is strongly affected by the sensitivity of the measuring system and the optical properties of the object. Particularly, in the wavelength region having a low measuring sensitivity, the radiation spectroscopic intensity is measured unduly low, compared with the theoretical value, making it impossible to calculate the surface temperature accurately. Also, the optical characteristics of the object should also be considered. For example, a Si wafer exhibits a transmittance of about 100% in an infrared region having a wavelength exceeding 1 μm, with the result that, if the wafer ωc is heated, the temperature of the heater 211a tends to be erroneously measured as the surface temperature of the wafer ωc.

In order to avoid the above-noted difficulty, it is possible to obtain the intensity integrated value by limiting the wavelength region to the region within which the measurement is not affected by the sensitivity characteristics of the measuring system and the optical characteristics of the object so as to calculate the surface temperature. In other words, the theoretical formula corresponding to Esb is: Esb=∫Edλ (scope of integration is λ1≦λ≦λ2). This indicates that the temperature can be measured by a method similar to the method of the first embodiment of the present invention. It follows that the influences given by the sensitivity characteristics of the measuring system and the optical characteristics of the object can be suppressed to a minimum level by limiting the wavelength region so as to measure the temperature highly accurately.

FIG. 20 shows the construction of a film forming amount measuring apparatus 220 according to a sixth embodiment of the present invention. As shown in the drawing, the film forming amount measuring apparatus 220 comprises a wafer stage 221 for holding a wafer (substrate) ωc, a lens 222 aligned with the wafer ωc for collecting the light radiated from the wafer ωc, an optical fiber 223 having one end aligned with the lens 222 to guide the radiated light collected by the lens 222, a spectroscope 224 aligned with the other end of the optical fiber 223 for subjecting the light having a wavelength falling within a predetermined range to a spectroscopic analysis for every wavelength step, an array sensor 225 mounted to the spectroscope 224 for detecting the intensity of the light subjected to the spectroscopic analysis for every wavelength step so as to generate an integrated value of the light intensity, a signal processing circuit 226 receiving the signal generated from the array sensor 225 so as to subject the received signal to an A/D conversion, and a computer 227 for calculating the intensity distribution of the radiated light based on the integrated value of the light intensity supplied from the signal processing circuit 226. A memory section 228 storing a table consisting of plural reference data is connected to the computer 227. Also, a heater 221a is mounted at a bottom portion of the wafer stage 221.

The film forming amount measuring apparatus 220 of the construction described above measures a film forming amount d on the wafer ωc during a film forming process as follows. Specifically, the light radiated from the surface of the wafer ωc disposed on the wafer stage 221 and heated by the heater 221a is collected by the lens 222 and, then, guided to the spectroscope 224 through the optical fiber 223. In the spectroscope 224, the light spectroscopically analyzed for every predetermined wavelength step is guided to the array sensor 225. In the array sensor 225, the integrated value of the light intensity of a predetermined wavelength step width is detected for every sensor. The integrated value is subjected to an A/D conversion in the signal processing circuit 226, and the A/D converted signal is supplied to the computer 227 so as to calculate the radiated light distribution. The particular operation is carried out immediately before the film formation and during the film formation.

Figure 10:
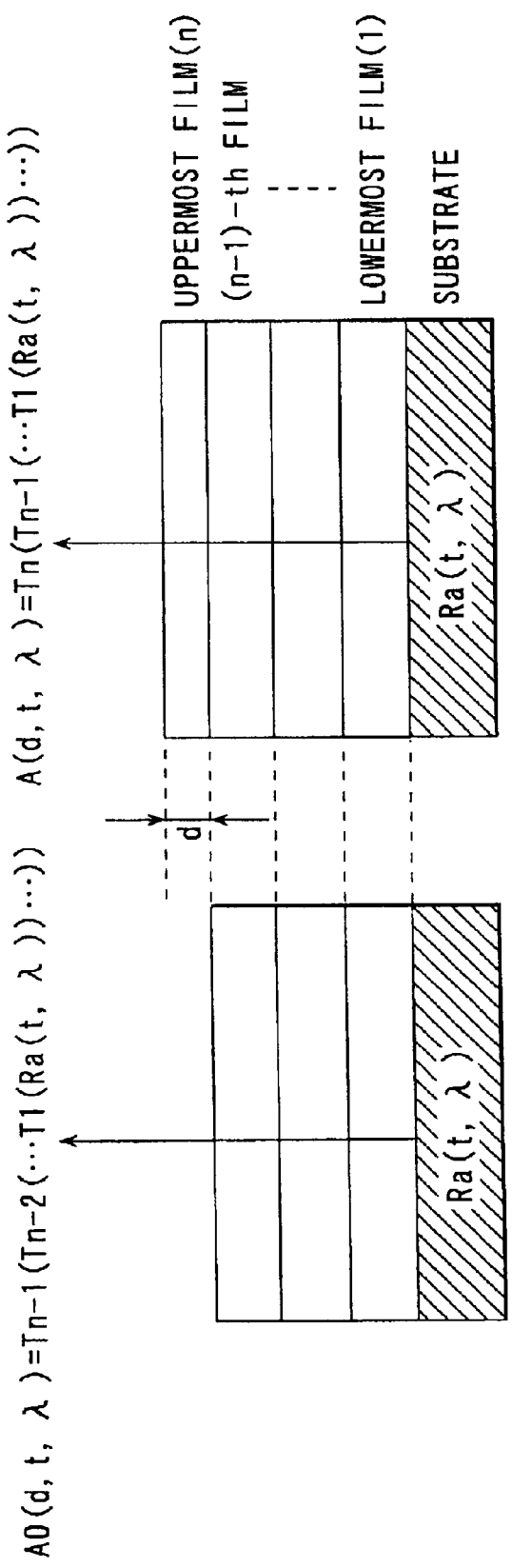
FIG. 10 shows the principle of measurement in the film thickness measuring apparatus shown in FIG. 9.

FIG. 10 is for explaining the reference radiated light distribution $A_O$ obtained from the wafer ωc immediately before the film formation and the actually measured radiated light distribution A obtained from the wafer ωc during the film formation. Specifically, the reference radiated light distribution $A_O$ is represented by:

$$A_O(d, t, \lambda) = T_{n-1}(T_{n-2}(\ldots T1\ (Ra(t, \lambda)) \ldots))$$

Figure 11A:
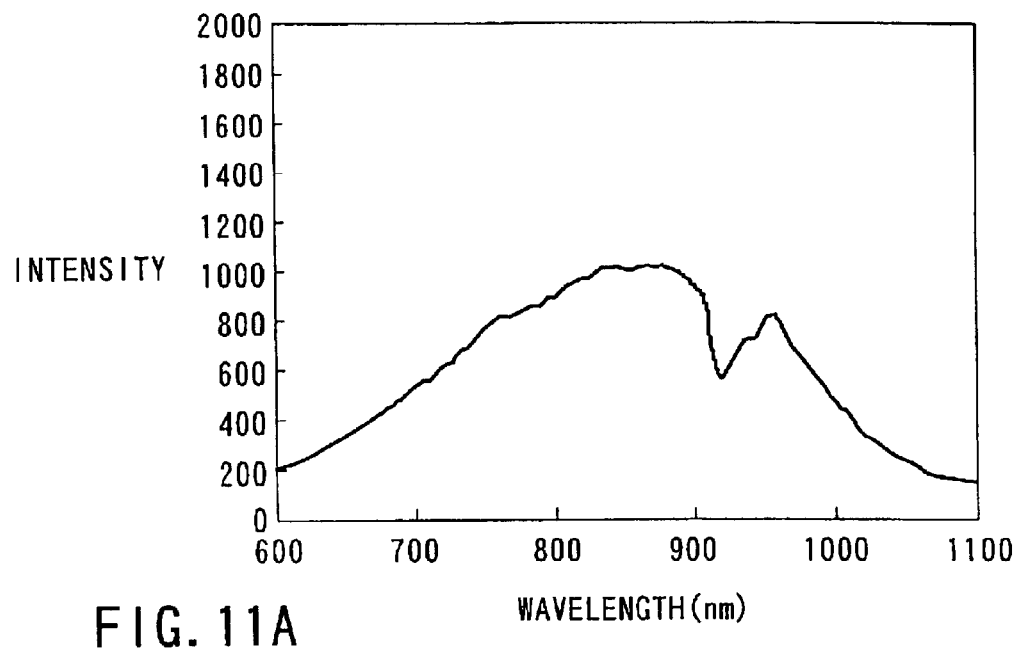
FIGS. 11A and 11B are graphs showing the intensity distribution of radiated light, which is measured by the film thickness measuring apparatus shown in FIG. 9.

When the radiated light Ra (t, λ) is transmitted through the films formed on the wafer ωc, i.e., the lowermost film to (n−1)-th film, the radiated light Ra (t, λ) is multiply reflected by the films formed on the wafer ωc. The influences given by the multiple reflections are taken into consideration in the reference radiated light distribution $A_O$ given above. FIG. 11A shows the reference radiated light distribution $A_O$.

On the other hand, the actually measured radiated light distribution A is represented by:

$$A(d, t, \lambda) = T_n(T_{n-1}(T1\ (Ra(t, \lambda)) \ldots))$$

Figure 11B:
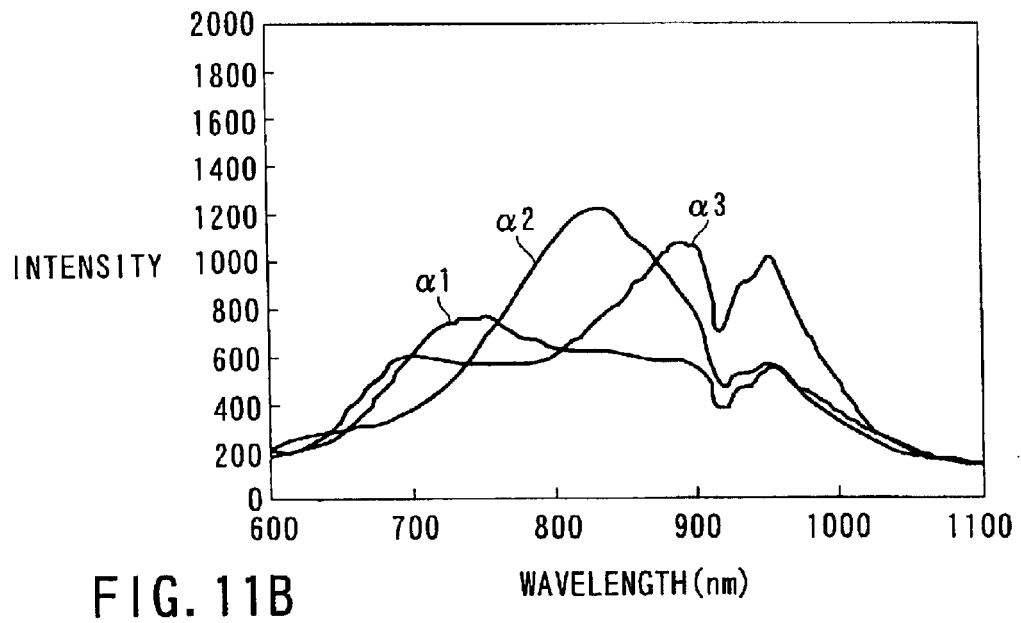

In this case, the influences given by the multiple reflections, which take place when the light Ra (t, λ) radiated from the wafer ωc is transmitted through the films (the lowermost film to the uppermost film) formed on the wafer ωc, is taken into consideration. FIG. 11B shows the actually measured radiated light distribution A. Curves a1, α1, α2, and α3 shown in FIG. 11B represent the actually measured radiated light distributions at different film forming amounts.

Figure 12A:
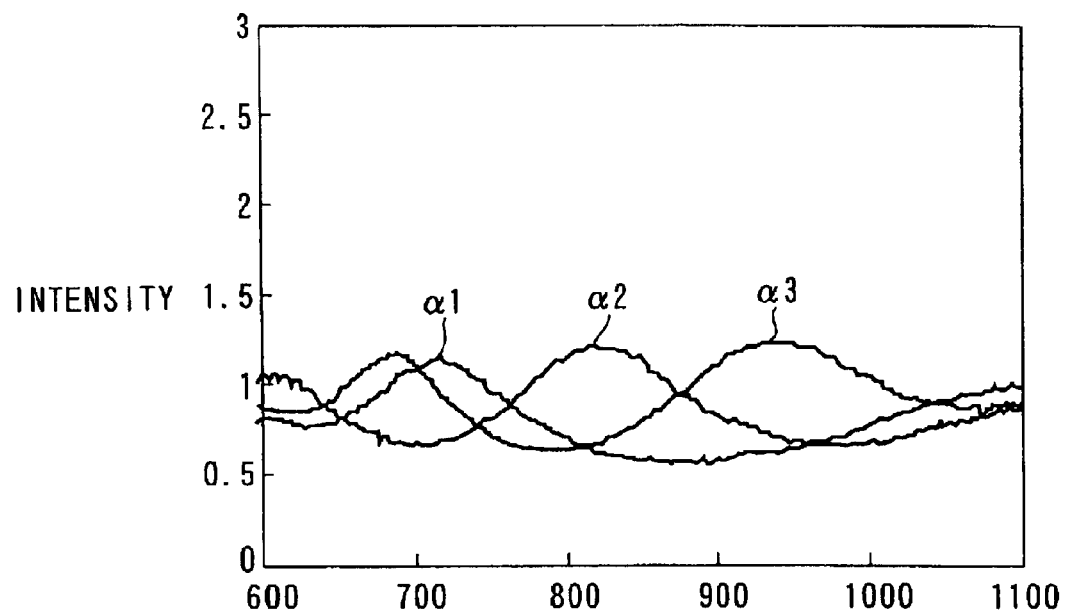
FIG. 12A is a graph showing the relative intensity distribution of radiated light.
Figure 12B:
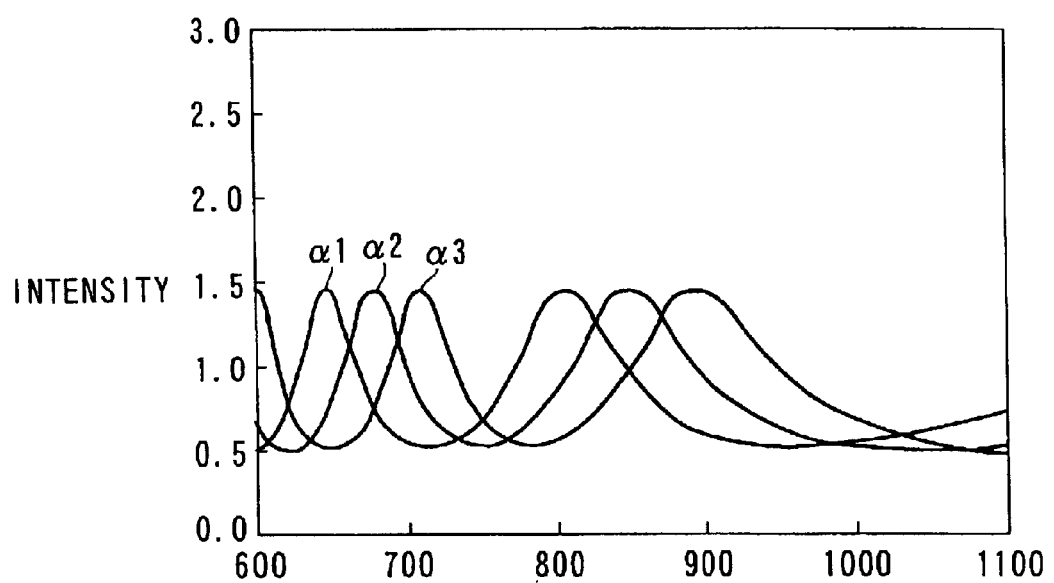
FIG. 12B is a graph showing the theoretical intensity distribution of radiated light.

It should be noted that, in a relative radiated light distribution B (d, t, λ), which is a ratio of the actually measured radiated light distribution A (d, t, λ) to the reference radiated light distribution $A_O$, i.e., A (d, t, λ)/$A_O$ (d, t, λ), the influence appears on the uppermost film (n-th film) alone, as shown in FIG. 12A. Incidentally, the influences given by the characteristics of the optical system such as the optical fiber 223 or the spectroscope 224 and by the noise derived from the disturbance are canceled by the arithmetic operation for conversion into the relative radiated light distribution B (d, t, λ) so as to improve the measuring accuracy of the film forming amount d.

Then, the film forming amount d is calculated by allowing the relative radiated light distribution B to match a theoretical radiated light distribution Br. To be more specific, if the refractive index N (n, k) of the uppermost film (n-th film) is known, the theoretical radiated light distribution Br (d, t, λ) showing the influences given by the uppermost film alone can be calculated from a single layer transmitted light theory in view of the repetition. Therefore, if the theoretical radiated light distribution Br is matched with the relative radiated light distribution B (d, t, λ), it is possible to estimate the film forming amount d of the uppermost film during the film forming process. As a matching method, there is a method of detecting the theoretical radiated light distribution Br (d, t, λ) which minimizes the absolute value of the difference K between the relative radiated light distribution B and the theoretical radiated light distribution amount Br, i.e., K=B (d, t, λ)−Br (d, t, λ).

Since the actual splitting of the radiated light is strongly affected by the sensitivity of the measuring system, the intensity of the split radiated light tends to be measured unduly low, compared with the theoretically calculated value, in the wavelength region of a low measuring sensitivity, making it difficult to calculate accurately the film forming amount. In this case, it is possible to estimate the film forming amount from the wavelength shifting amount of the intensity waveform maximal value by utilizing the characteristic that the waveform denoting the intensity of the split radiated light is shifted toward a longer wavelength side. This method is very effective against the influences given by, for example, the change in sensitivity of the measuring apparatus.

The film forming amount measuring apparatus 220 of the sixth embodiment described above makes it possible to measure highly accurately the film forming amount of the uppermost film during film formation on the wafer ωc. Also, the film forming amount can be measured highly accurately by utilizing the radiated light even under the condition that the wafer ωc is rotated at a high speed, which is unsuitable for measuring the reflected light. It should also be noted that, if the film forming amount measuring apparatus 220 is mounted in a film forming apparatus and the film formation is stopped when the film forming amount reaches a predetermined value, the end point of the film formation can be controlled in the film forming apparatus.

Figure 9:
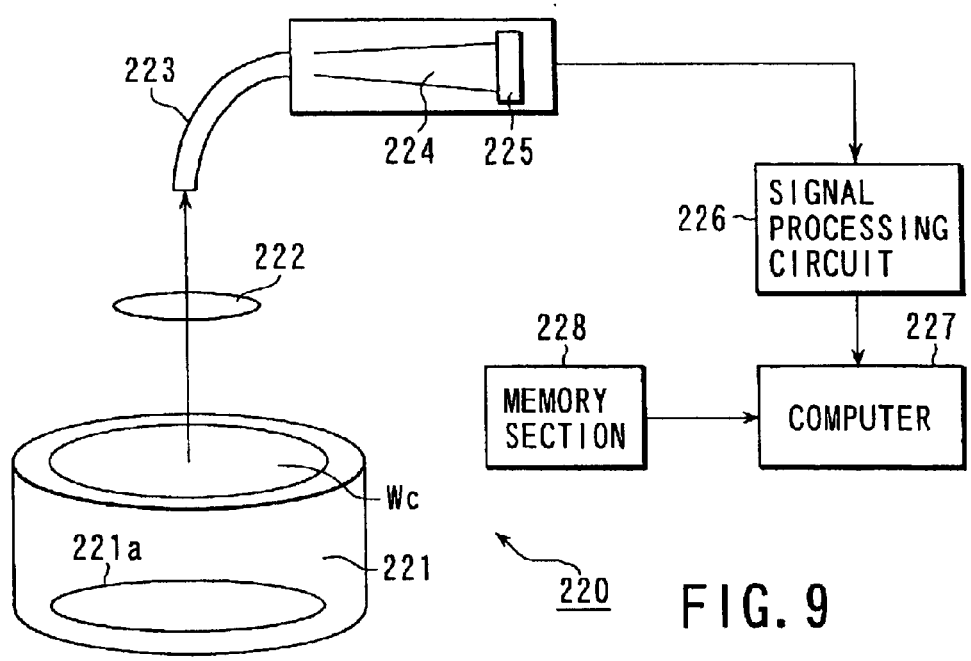
FIG. 9 shows the construction of a film thickness measuring apparatus according to a sixth embodiment of the present invention.
Figure 13:
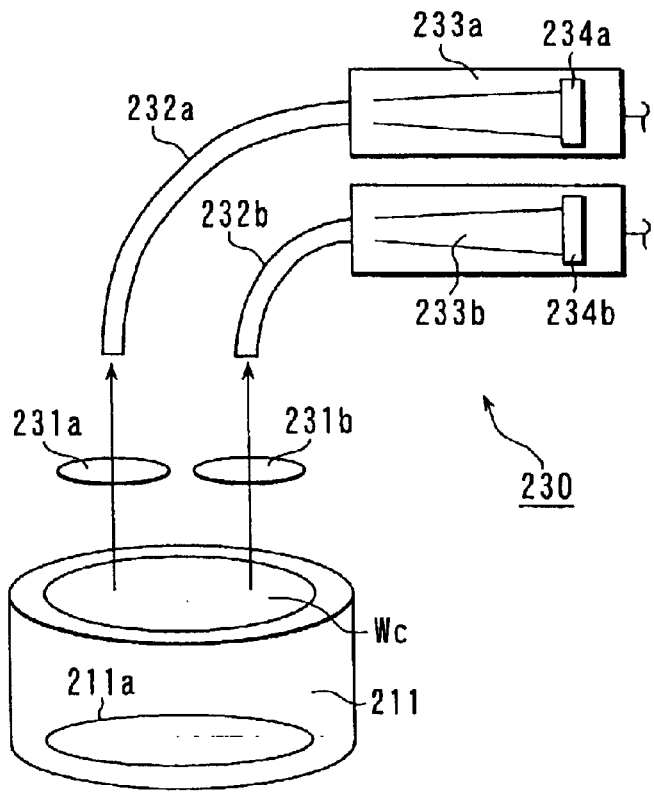
FIG. 13 shows the construction of a gist portion of a film thickness measuring apparatus according to a modification of the sixth embodiment of the present invention.

FIG. 13 shows an essential portion of a film forming amount measuring apparatus 230 according to a modification of the film forming amount measuring apparatus 220 shown in FIG. 9. Those members of the apparatus 230 which are common with the members of the apparatus shown in FIG. 9 are denoted by the same reference numerals so as to avoid an overlapping description. The film forming amount measuring apparatus 230 differs from the apparatus 220 in that the film forming amount is measured at plural measuring points. Therefore, a lens 231a, an optical fiber 232a, a spectroscope 233a, and an array sensor 234a are arranged in parallel with a lens 231b, an optical fiber 232b, a spectroscope 233b, and an array sensor 234b, respectively.

Figure 14:
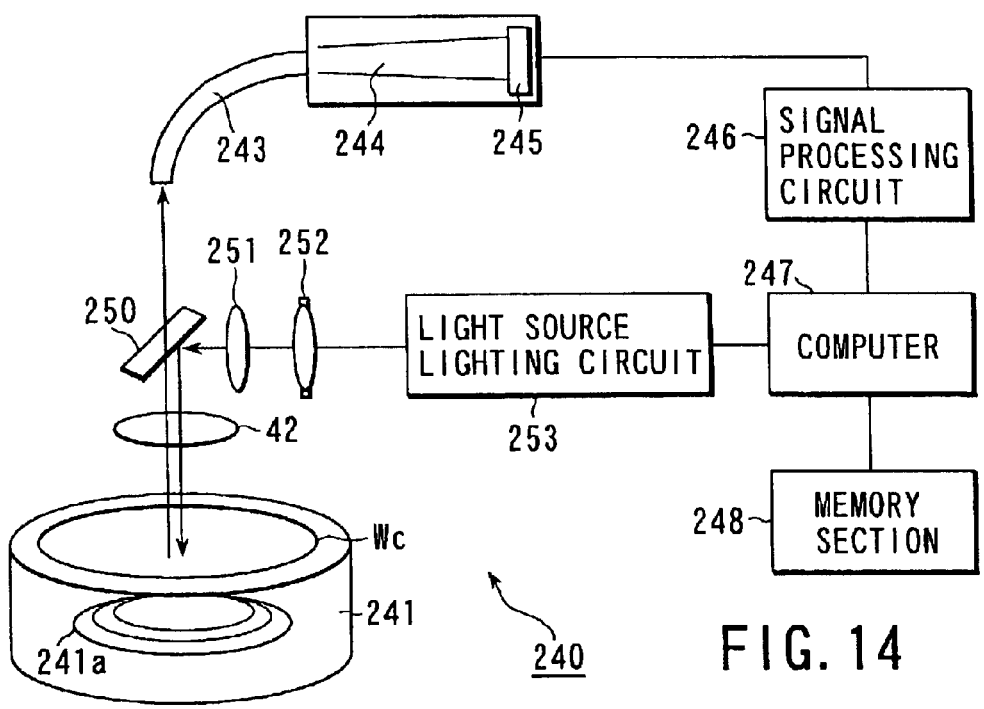
FIG. 14 shows the construction of a film thickness measuring apparatus according to a seventh embodiment of the present invention.
Figure 15A:
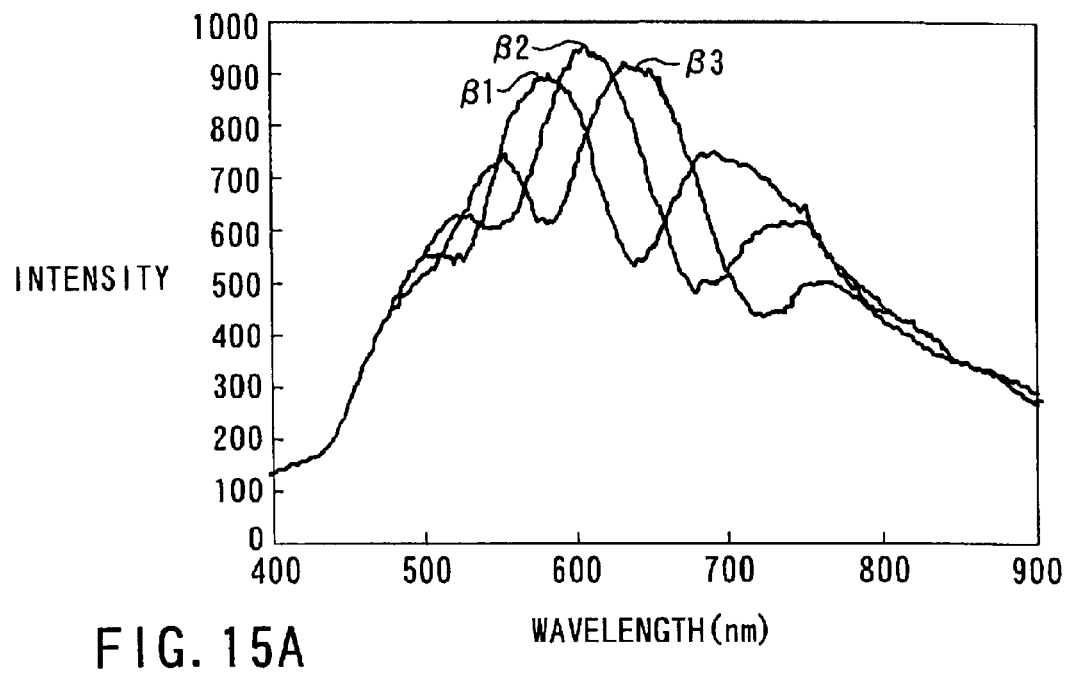
FIGS. 15A and 15B show the intensity distribution of the reflected light, which is measured by the film thickness measuring apparatus shown in FIG. 14.
Figure 15B:
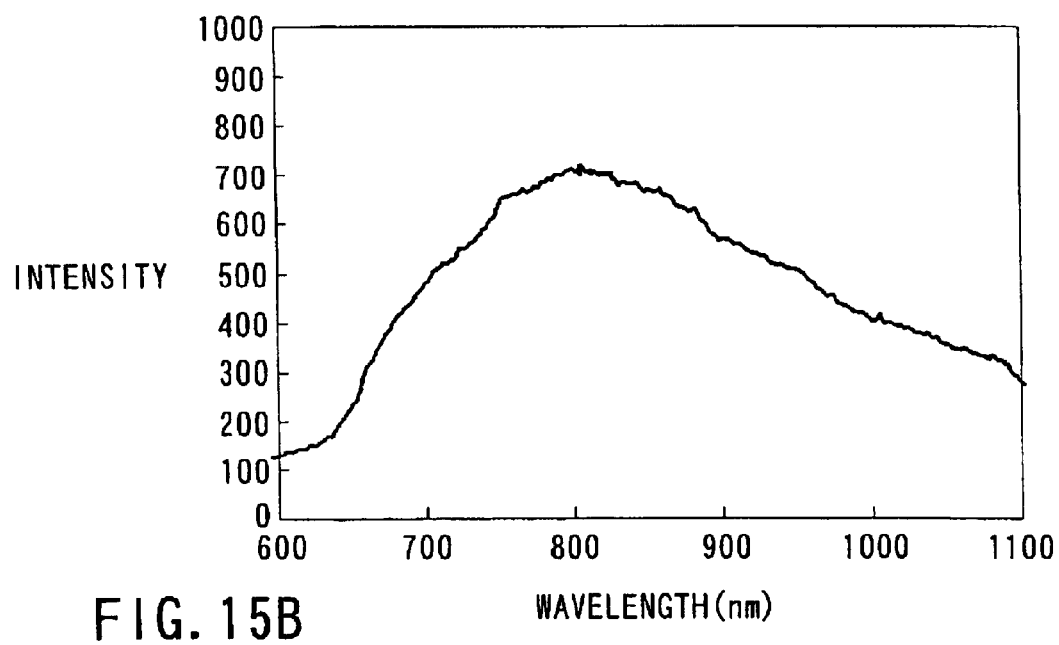

FIG. 14 shows the construction of a film forming amount measuring apparatus 240 according to a seventh embodiment of the present invention. As shown in the drawing, the film forming amount measuring apparatus 240 comprises a wafer stage 241 for holding a wafer (substrate) ωc, a lens 242 aligned with the wafer ωc for collecting the light radiated from the wafer ωc, an optical fiber 243 having one end positioned to face the lens 242 for guiding the radiated light collected by the lens 242, a spectroscope 244 positioned to face the other end of the optical fiber 243 for splitting the light having a wavelength falling within a predetermined range for every wavelength step, an array sensor 245 mounted to the spectroscope 244 for detecting the intensity of the split light for every wavelength step so as to generate an integrated value of the light intensity, a signal processing circuit 246 for collecting the signal generated from the array sensor 245 so as to subject the collected signal to an A/D conversion, and a computer 247 receiving the output signal of the signal processing circuit 246 for calculating the intensity distribution of the radiated light based on the integrated value of the light intensity. A memory section 248 storing a table consisting of plural reference data is connected to the computer 247. Incidentally, a heater 241a is mounted at a bottom portion of the wafer stage 241.

On the other hand, a half mirror 250 is arranged between the lens 242 and the optical fiber 243. The half mirror 250 is irradiated with the light source 252 so as to permit the wafer stage 241 to be irradiated with the light reflected from the half mirror 250. Further, a light source lighting circuit 253 is connected to the light source 252.

In the film forming amount measuring apparatus 240 of the construction described above, the film forming amount d on the wafer ωc during the film forming process is measured as follows. The measurement is performed in advance before the film formation. Specifically, the light source 252 is turned on so as to permit the wafer ωc to be irradiated with the light radiated from the light source 252 through the lens 251 and the half mirror 250. The light is reflected from the surface of the wafer ωc. On the other hand, light is radiated from the wafer ωc disposed on the wafer stage 241 and heated by the heater 241a. The reflected light and radiated light are collected by the lens 242 and guided to the spectroscope 244 through the optical fiber 243. In the spectroscope 244, the light split for every predetermined wavelength step is guided to the array sensor 245. In the array sensor 245, the integrated value of the light intensity of a predetermined wavelength step width is detected by every sensor. The integrated value thus detected is subjected to an A/D conversion in the signal processing circuit 246 and, then, supplied to the computer 247.

Obtained in the computer 247 is a first intensity distribution P1 (d, t, λ) of the split light including both the reflected light and the radiated light. On the other hand, the radiated light alone from the wafer ωc is similarly measured by turning off the light source 252 so as to obtain a second intensity distribution P2 (d, t, λ) of the split light.

A difference $L_o$ between the first intensity distribution P1 of the split light and the second intensity distribution P2 of the split light represents a reference intensity distribution of the reflected light alone, which is stored in the memory section 248. Incidentally, the difference $L_o$ is equal to $R_{n-1}$ ($R_{n-2}$ ( . . . R1 (S(λ)·J(λ)) . . . )). The formula indicates that the product between the wavelength distribution S (λ) of the light source 252 and the influences J (λ) of the illumination optical system and the light receiving optical system is modified by the multiple reflection of the light by the films formed on the wafer ωc (i.e., the lowermost film (1) to the (n−1)-th film).

Then, the film formation process is started. In this step, the light source 252 is turned on and the light beams radiated and reflected from the wafer ωc are similarly measured so as to obtain a third intensity distribution P3 (d, t, λ) of the split light. Further, the light source 252 is turned off, and the light beam radiated from the wafer ωc is measured similarly so as to obtain a fourth intensity distribution P4 (d, t, λ) of the split light.

A difference L between the third intensity distribution P3 of the split light and the fourth intensity distribution P4 of the split light represents an actually measured intensity distribution of the reflected light. The difference L is equal to $R_n$ ($R_{n-1}$ ( . . . R1 (S(λ)·J(λ)) . . . )). The formula indicates that the product between the wavelength distribution S (λ) of the light source 252 and the influences J (λ) of the illumination optical system and the light receiving optical system is modified by the multiple reflection of the light by the films formed on the wafer ωc (i.e., the lowermost film (1) to the uppermost film (n)).

Figure 16A:
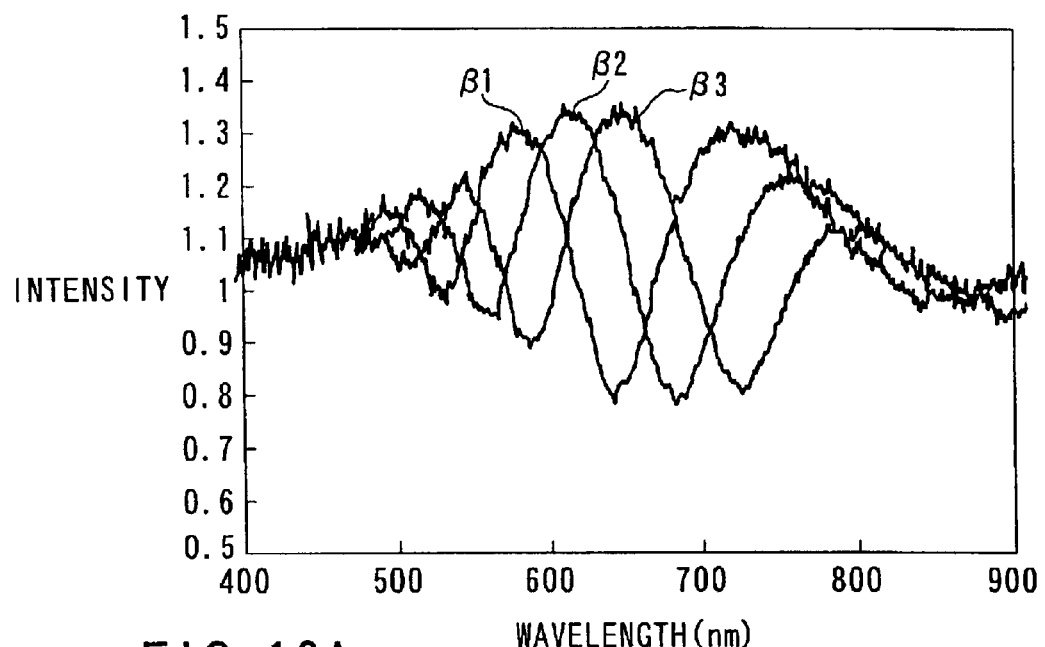
FIG. 16A is a graph showing a relative intensity distribution of radiated light.
Figure 16B:
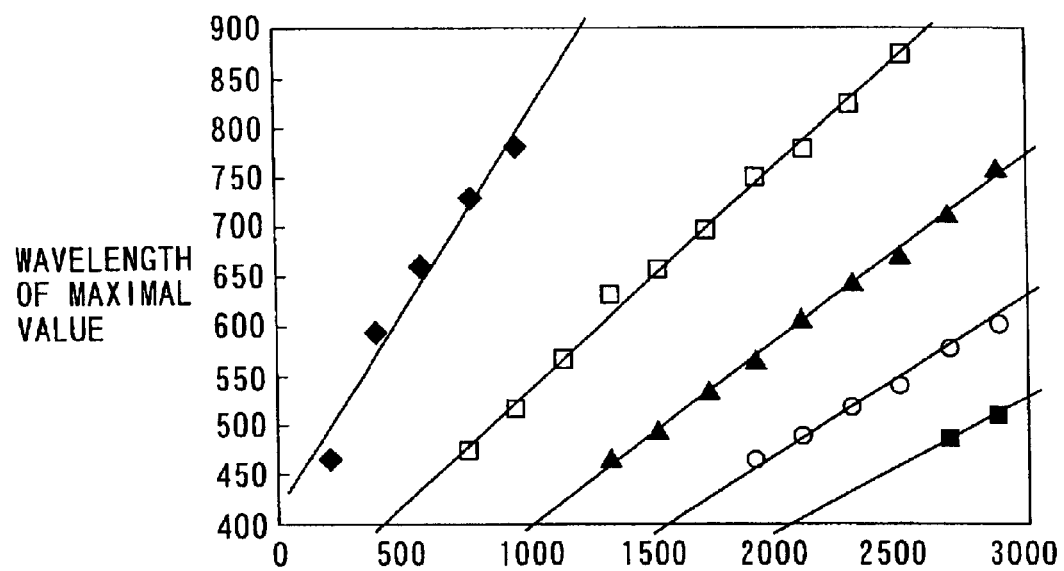
FIG. 16B is a graph showing the relationship between the film thickness and the wavelength at which a maximal value takes place.

FIG. 16A shows the actually measured intensity distribution of the reflected light. Curves β1, β2 and β3 shown in FIG. 16A represent the actually measured wavelength distributions at different film forming amounts. On the other hand, FIG. 12A shows a relative intensity distribution F (d, t, λ) of the reflected light, which is a ratio of the actually measured intensity distribution L (d, t, λ) of the reflected light to the reference intensity distribution $L_o$ (d, t, λ) of the reflected light, i.e., F (d, t, λ)=L (d, t, λ)/$L_o$ (d, t, λ). The relative intensity distribution F (d, t, λ) of the reflected light represents the influence given by the uppermost film (n) alone.

It should be noted that the influences given by the characteristics of the optical system such as the optical fiber 243 and the spectroscope 244 and the noise derived from the disturbance are canceled by the arithmetic operation for conversion into the relative intensity distribution F (d, t, λ) of the reflected light, leading to an improved measuring accuracy of the film forming amount d.

Then, the film forming amount d is calculated by comparing the relative intensity distribution F of the reflected light with reference data (reference intensity distribution of the reflected light) $F_{ref}$. The reference data $F_{ref}$ denotes the calculated value obtained by a theoretical calculation of the thin film interference or the actually measured value in the case where a film is formed in advance under the same film forming conditions. In any case, the relationship between the reference data $F_{ref}$ and the film forming amount d is quantitatively known.

The signal F denoting the influence of the uppermost film (n) alone is dependent on the film forming amount of the uppermost film which is being laminated. It should be noted that the relative reflected light distribution F is shifted toward the longer wavelength side with an increase in the film forming amount. Therefore, if attention is paid to the maximal value of the relative reflected light distribution F so as to obtain the wavelength shift amount thereof, the thickness d of the uppermost film can be estimated by comparing the wavelength shift amount with the reference data $F_{ref}$. It follows that the film forming amount of the uppermost film can be measured accurately without relying on the construction of the underlying film.

As described above, the film forming amount measuring apparatus 240 according to the seventh embodiment of the present invention makes it possible to measure highly accurately the film forming amount of the uppermost film formed on the wafer ωc during the film forming process on the wafer ωc. Also, the thickness of the uppermost film can be measured easily without relying on the construction of the underlying film of the wafer ωc. Further, the film thickness can be measured highly accurately while eliminating the influences given by the sensitivity characteristics and the optical characteristics of the object. Incidentally, a film forming apparatus capable of controlling the end point of the film formation can be provided by mounting the film forming amount measuring apparatus 240 in the film forming apparatus to permit the film formation to be stopped when a predetermined film forming amount is reached.

Figure 17:
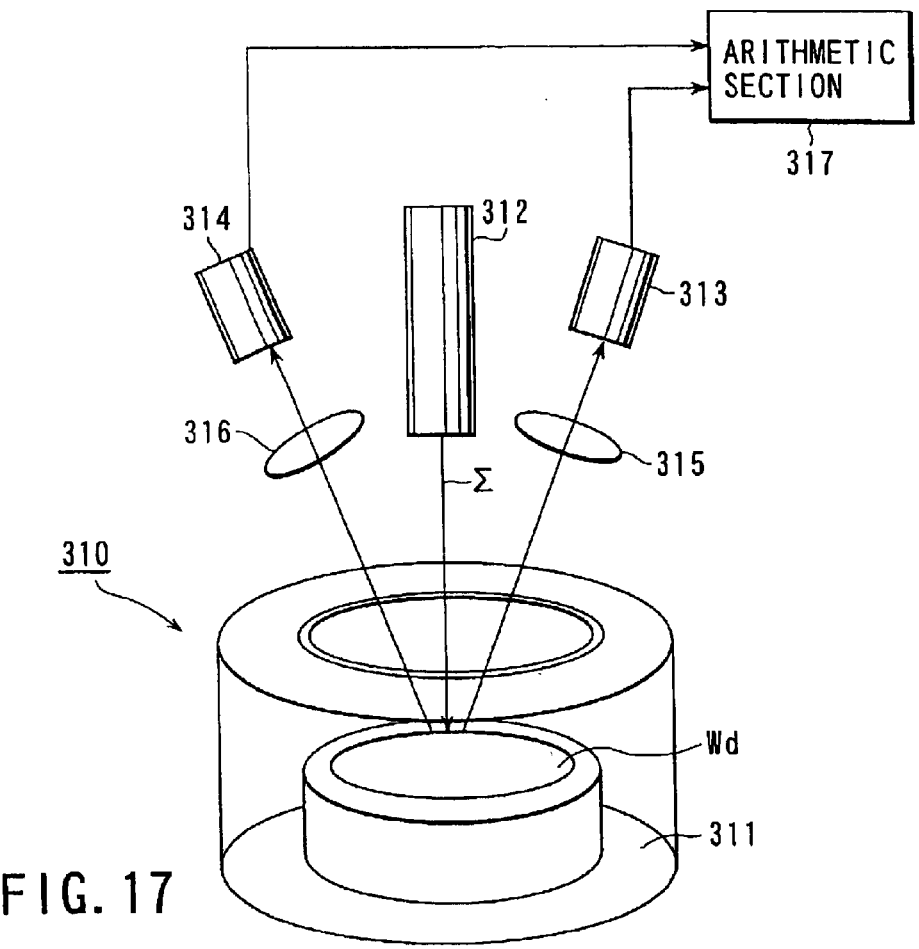
FIG. 17 shows the construction of a monitoring apparatus according to an eighth embodiment of the present invention.
Figure 18:
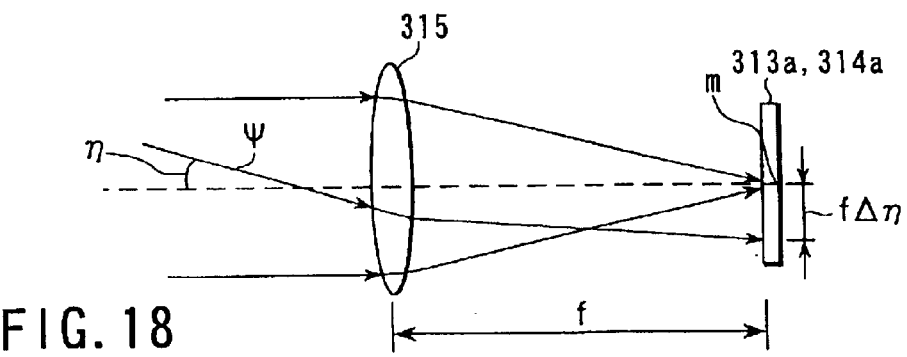
FIG. 18 schematically shows the positional relationship between a lens and a CCD camera incorporated in the monitoring apparatus shown in FIG. 17.

FIG. 17 schematically shows a monitoring apparatus 310 according to an eighth embodiment of the present invention. As shown in the drawing, the monitoring apparatus 310 comprises a He—Ne laser device 312 for irradiating a semiconductor wafer ωd housed in a film forming chamber 311 with a laser beam Σ, a pair of CCD cameras 313, 314 for detecting the diffracted light reflected from the semiconductor wafer ωd, lenses 315, 316 aligned between the semiconductor wafer ωd and each of the CCD cameras 313, 314, and an arithmetic section 317 for performing arithmetic operations based on the output signals generated from the CCD cameras 313, 314 as described later herein.

The pickup faces 313a, 314a of the CCD cameras 313, 314 are positioned at the focal length t of the lenses 315, 316. Also, regular fine patterns are formed on the surface of the semiconductor wafer ωd.

The temperature of the semiconductor wafer ωd is measured by the monitoring apparatus 310 as follows. Specifically, the semiconductor wafer ωd is irradiated with the laser beam Σ emitted from the He—Ne laser device 312. The laser beam Σ is reflected as a diffracted light Ψ at an angle conforming with the distance of the pattern formed on the semiconductor wafer ωd.

The diffracted light Ψ is incident on each of the lenses 315, 316 at an angle η so as to be collected and forms spot images Λ1, Λ2 on the CCD cameras 313, 314, respectively. It should be noted that, since the diffracted light Ψ is collected by the lenses 315, 316, the positions at which the spot images Λ1, Λ2 are formed are deviated by an amount of fΔΛ from the focus C of the lenses 313, 314.

To be more specific, the spot images Λ1, Λ2 on the CCD cameras 313, 314 are formed at the positions conforming with the angle η at which the diffracted light Ψ is incident on the lenses 315, 316 regardless of the positions at which the diffracted light Ψ is incident on the lenses 315, 316. It follows that the positional deviation caused by the refraction of the diffracted light Ψ depending on the thin film and the ambient temperature is rendered negligible.

Figure 19A:
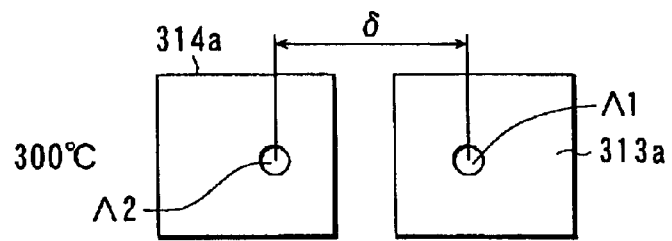
FIGS. 19A to 19C show spot images formed by a CCD camera incorporated in the monitoring apparatus shown in FIG. 17.
Figure 19B:
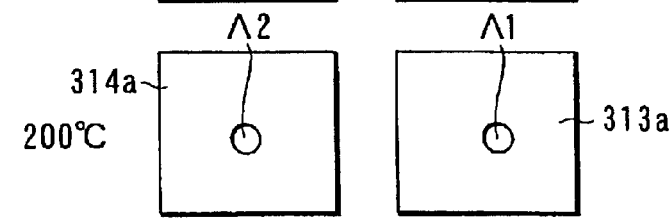
Figure 19C:
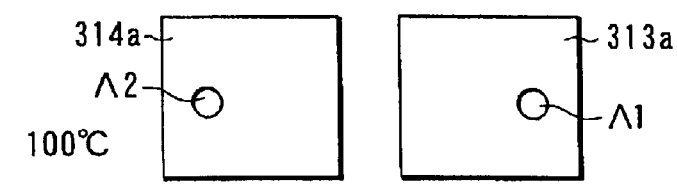

FIGS. 19A to 19C show the positions of the spot images Λl, Λ2 at 300° C., 200° C. and 100° C., respectively. Position signals of these spot images Λ1, Λ2 are supplied to the arithmetic section 317. The distance δ between the spot images Λ1, Λ2 is calculated in the arithmetic section 317 based on these position signals, and the temperature of the semiconductor wafer ωd is calculated from the distance δ.

It should also be noted that the intensity of the diffracted light Ψ is changed to depict a sine wave in accordance with changes in the thickness of the film formed on the semiconductor wafer ωd. Therefore, the thickness of the film formed on the wafer ωd can also be measured simultaneously by measuring the intensity of the spot images formed on the CCD cameras 313, 314.

Figure 20A:
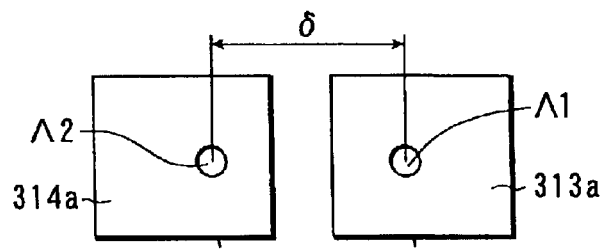
FIGS. 20A and 20B show how an inclination of a semiconductor wafer is corrected by using the monitoring apparatus shown in FIG. 17.
Figure 20B:
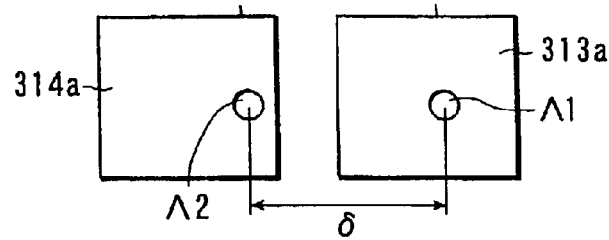

FIGS. 20A and 20B cover the case where the object of the semiconductor wafer ωd is tilted. If the semiconductor wafer ωd is tilted, the positions of the spot images Λ1, Λ2 are deviated. However, the two sensors are similarly affected by this inclination, with the result that the distance δ between the spot images Λ1, Λ2 is left unchanged so as to cancel the tilt of the semiconductor wafer ωd. It follows that the temperature can be measured accurately.

As described above, in the monitoring apparatus 310 of the eighth embodiment, the diffracted light Ψ is collected to form spot images Λ1, Λ2 on the pickup faces of the CCD cameras 313, 314 in accordance with the incident angle at the lenses 315, 316. Also, the influences given by the thickness of the film formed on the semiconductor wafer ωd and by the change in the ambient temperature are canceled by measuring the distance between these spot images Λ1, Λ2 so as to decrease the measuring error. It follows that the temperature of the wafer and the thickness of the film formed on the wafer can be measured without being affected by the refraction dependent on the film thickness and the ambient temperature.

Figure 21:
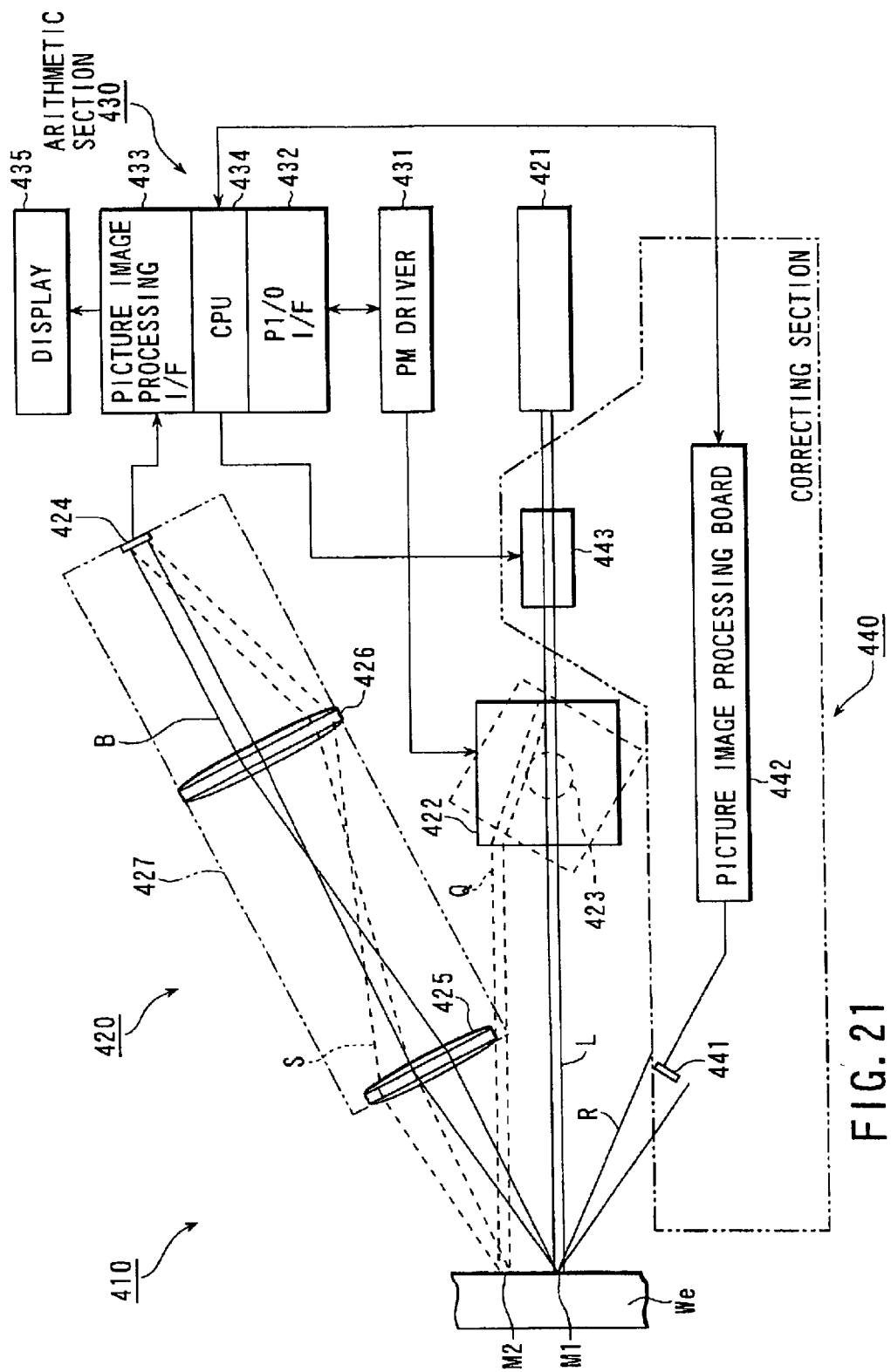
FIG. 21 shows the construction of a temperature measuring apparatus according to a ninth embodiment of the present invention.

FIG. 21 shows the construction of a temperature measuring apparatus 410 according to a ninth embodiment of the present invention. As shown in the drawing, the temperature measuring apparatus 410 comprises a detecting section 420, an arithmetic section 430 and a correcting section 440.

The detecting section 420 consists of a laser oscillator 421 for oscillating, for example, a He—Ne laser beam for irradiating a wafer ωe, a prism (optical system for determining position) 422 for shifting an optical path for moving the laser beam in parallel, a driving mechanism 423 such as a pulse motor for rotating the prism 422 in two directions, a CCD camera (light detecting section) 424 for observing interference fringes, and two lenses (optical system for correcting changes) 425, 426 for guiding the interference fringes into the CCD camera 424. The CCD camera 424 and the lenses 425, 426 are integrally incorporated in an optical cylinder 427 having a black light absorber mounted to the inner surface thereof.

The prism 422 is rotated to permit the laser beam L to be shifted in parallel so as to move the irradiating point from M1 to M2, as denoted by, for example, a broken line Q in FIG. 21. Therefore, the temperature can be measured at many points on the wafer ωe. Incidentally, the CCD camera 424 includes a light receiving face 424a, as shown in FIG. 22A. Also, a filter 424b capable of transmitting the light having a wavelength equal to that of the laser beam L is arranged in front of the light receiving face 424a of the CCD camera 424.

On the other hand, the lenses 425, 426 perform the function as described in the following. Specifically, the lenses 425, 426 permit the interference fringes to be kept incident on the stationary CCD camera 424 even if the measuring point is changed. For example, in the case of using a lens having a focal length of 100 mm, the interference fringes incident on the lens 425 are kept incident on a predetermined point of the CCD camera 424 by the arrangement shown in FIG. 21, in which the distance between the irradiating point on the wafer we and the lens 425 is 200 mm, the distance between the two lenses 425 and 426 is 300 mm, and the distance between the lens 426 and the CCD camera 424 is 200 mm. It should be noted that a solid line B shown in FIG. 21 represents the interference fringes when the wafer ωe is irradiated with the laser beam L at the irradiating point M1. Also, a broken line S represents the interference fringes when the wafer ωe is irradiated with the laser beam Q at the irradiating point M2.

The arithmetic section 430 consists of a PM driver 431 for driving a pulse motor 423, a P1/O-1/F 432 for transmitting a command signal to the PM driver 431, an image processing I/F 433 for receiving the picture image caught by the CCD camera 424 and for displaying the received picture image on a display 435, which is referred to later, a CPU 434 for collectively controlling the image processing operation, the arithmetic operation, etc., and the display 435 for displaying the picture image.

Further, the correcting section 440 includes a CCD camera 441, an image processing board 442 for processing the image signal generated from the CCD camera 441, and a beam diameter controller 443.

The surface temperature of the wafer ωe is measured by the temperature measuring apparatus 410 of the construction described above as follows. Specifically, a pair of concave portions P1, P2 of the concave and convex pattern P on the surface of the wafer ωe are irradiated with the laser beam L emitted from the laser oscillator 421, as shown in FIG. 22. Incidentally, FIG. 22 schematically shows the phenomenon taking place when the laser beam L is incident on the concave and convex pattern P within an optional range. As shown in FIG. 22, diffracted light beams K1, K2 are generated from the concave portions P1, P2 so as to form interference fringes B at the intersection between the diffracted light beams K1 and K2. The interference fringes B thus formed are caught by the CCD camera 424 so as to obtain an image of the interference fringes within the range of the light receiving face 424a.

FIG. 22B shows an image of the interference fringes obtained by detecting the interference fringes B with the CCD camera 424 when the pattern P is irradiated with the laser beam L. In this example, the concave portions P1, P2 are oblong and, thus, the images of the interference fringes are rendered oblong. This is caused by the phenomenon that the diffracted light beams K1, K2 are expanded in inverse proportion to the lengths of the concave portions P1, P2. Therefore, the interference fringes B are expanded in the direction of the shorter side (X-direction), as shown in the drawing.

Let us describe the relationship between the interference fringes B and the temperature of the wafer ωe. If the wafer heated, the substance forming the wafer ωe is expanded so as to increase the distance between the adjacent patterns P, as shown in, for example, FIG. 23. As a result, the initial cross point N1 is moved to a point N2 positioned away from the wafer ωe, as shown in FIG. 23. Therefore, where the CCD camera 424 is stationary, a special behavior is observed as if the interference fringes B approach the CCD camera 424. It follows that the number of interference fringes B incident on the CCD camera 424 is increased so as to cause the distance between the adjacent fringes of the picture image of the interference fringes on the CCD camera 424 to be narrowed. In other words, the temperature change of the wafer ωe is correlated with the reduction in the distance between adjacent fringes of the interference fringes B, making it possible to obtain the change in temperature by detecting the change in the distance between adjacent fringes of the interference fringes B.

Incidentally, if the pitch of the pattern P and the wavelength of the laser beam L at a certain temperature are known, the distance between adjacent fringes of the interference fringes B can be calculated from the distance between the wafer ωe and the CCD camera 424, making it possible to identify the absolute value of the wafer temperature.

Figure 24A:
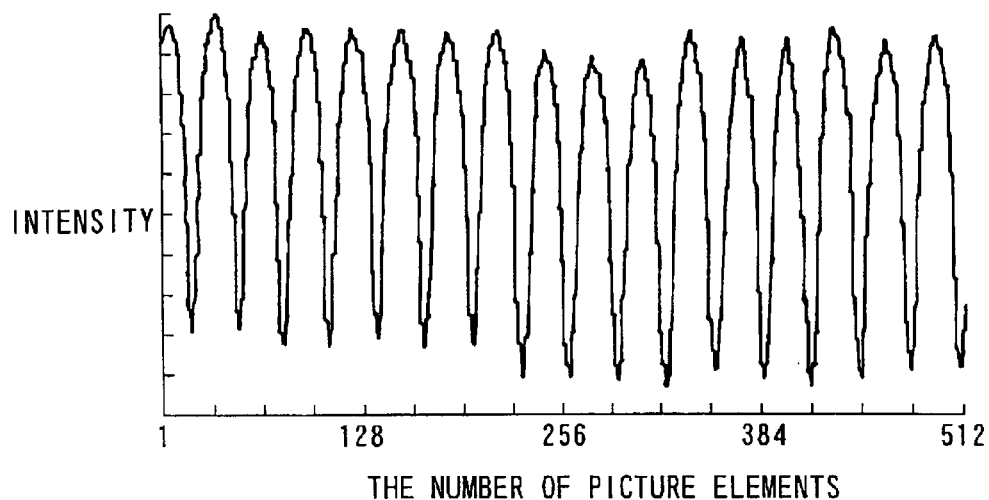
FIGS. 24A and 24B show the intensity distribution of interference fringes in the temperature measuring apparatus shown in FIG. 21 and the result of calculation by a maximum entropy method.

There now follows a description of how to calculate the distance between adjacent fringes of the interference fringes B. FIG. 24A is a graph showing the light intensity distribution in an X-direction of the picture image of the interference fringes B. In this graph, the number of picture elements in an X-direction of the CCD camera 424 is set at 512, and the light intensities in a Y-direction are added for each picture element in the X-direction. As shown in the drawing, the light intensity distribution in a planar direction forms a sine wave, and the distance between adjacent maximal values corresponds to the distance between adjacent fringes of the interference fringes B. It is certainly possible to obtain the change in temperature by simply calculating the change in the distance between adjacent maximal values. In this case, however, the resolution is dependent on the pitch of the picture elements of the CCD camera 424.

Figure 24B:
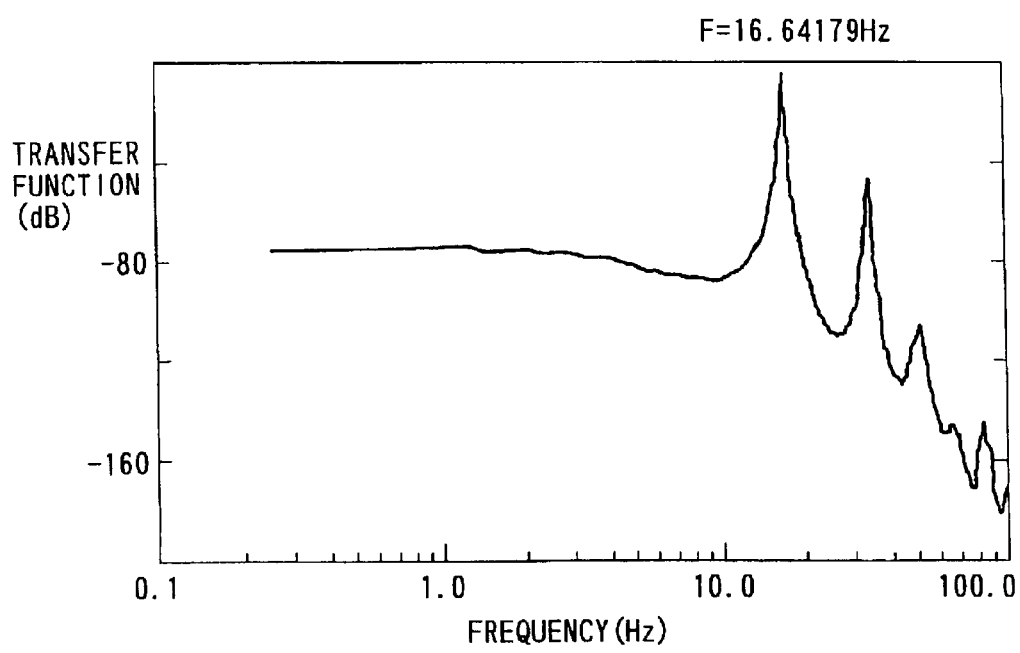

For improving the accuracy of the calculation, the change in frequency of the sine wave is calculated. To be more specific, the change in frequency is inversely proportional to the change in the distance between adjacent fringes and, thus, the temperature is proportional to the frequency. In other words, the frequency is increased with increase in the temperature. FIG. 24B shows that the frequency is calculated to be, for example, 16.64179 Hz by the maximum entropy method (MEM), which is an example of the frequency analysis.

Figure 27A:
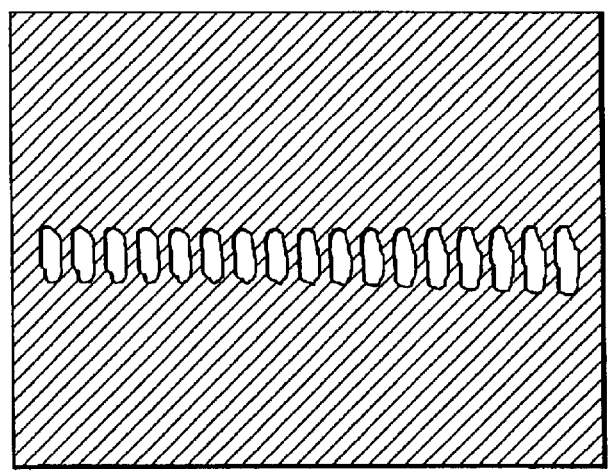
FIGS. 27A and 27B show images of interference fringes in the temperature measuring apparatus shown in FIG. 21.
Figure 27B:
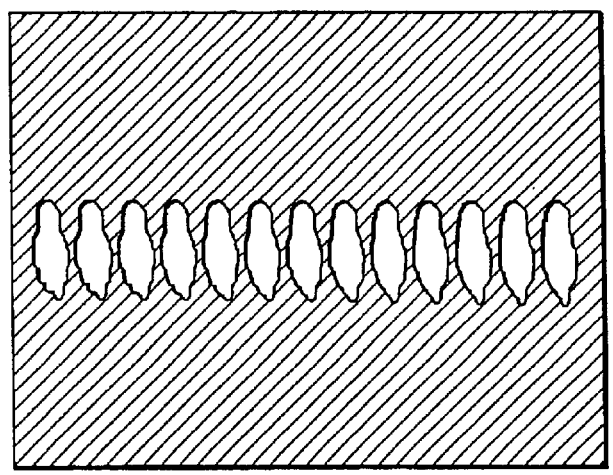

The movement of the measuring point accompanying the change in temperature is corrected in the present invention. Specifically, FIGS. 25 and 26 show the difference in behavior between two picture images of the interference fringes. FIG. 25A shows the positional relationship among the measuring point, the lenses 425, 426, and the CCD camera 424. FIG. 25B shows in a magnified fashion the measuring point. Further, FIG. 25C shows the light intensity distribution of a picture image detected for measuring the temperature. The letter d in FIG. 25B denotes the distance between the concave portions P1, P2, and Δd represents the amount of change in the distance d caused by the temperature change. On the other hand, FIG. 26A shows the positional relationship between the measuring point accompanying the temperature change and the CCD camera 441. Also, FIG. 26B shows the light intensity distribution of a picture image for detecting the moving amount. The symbol ΔD shown in FIG. 26B denotes the amount of movement of the light intensity distribution. Further, FIGS. 27A and 27B show the interference fringes B and S obtained by the CCD cameras 424 and 441, respectively.

As apparent from FIG. 25C, the interference fringes B and S detected by the CCD camera 424 are caused to be incident in predetermined positions by the lenses 425, 426 even if the wafer ωe is expanded by the temperature heating so as to move the measuring point.

Figure 28:
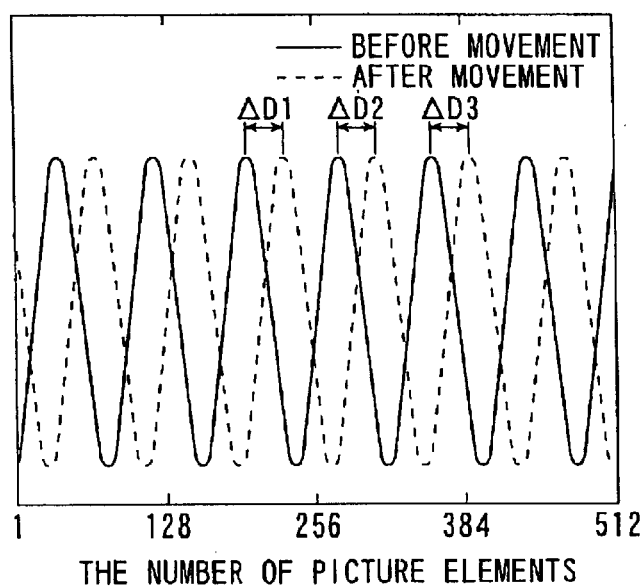
FIG. 28 shows the principle of measuring the moving amount in the temperature measuring apparatus shown in FIG. 21.

On the other hand, FIG. 26B shows that the light intensity distribution is moved by an amount of ΔD, which is close to the actual moving amount, in the case of the picture image for detecting the moving amount. FIG. 28 shows the principle for obtaining the moving amount from the light intensity distribution. Specifically, for improving the accuracy, changes in plural maximal values are calculated to obtain an average value in analyzing the changes in the positions of the maximal values before and after the movement. The true moving amount can be obtained by comparing the data of the moving amount thus obtained with known data, followed by correcting the resultant error.

Figure 29A:
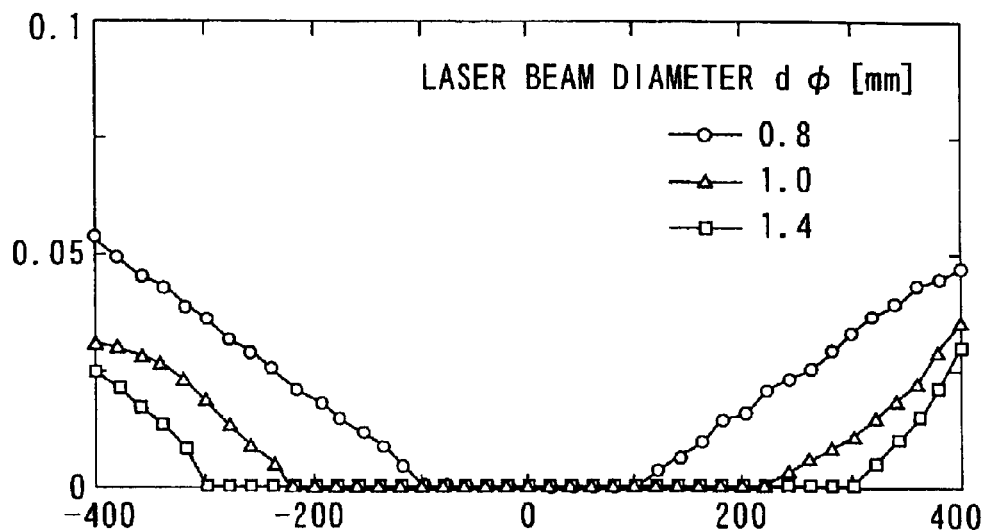
FIGS. 29A and 29B show how a measuring error is caused by a laser beam diameter in the temperature measuring apparatus shown in FIG. 21.
Figure 29B:
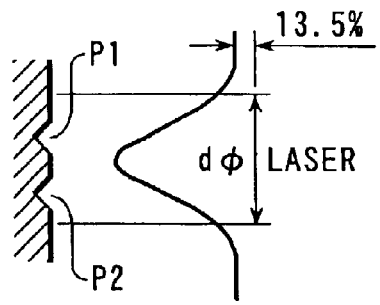

There now follows a description of how to correct the error caused by the beam diameter of the laser beam L. Specifically, the laser beam itself exhibits an intensity distribution, as shown in FIG. 29, with the result that an error is generated if the measuring point is moved only slightly, even if the laser is stationary. Therefore, the error is less likely to be affected by the movement of the measuring point if the intensity distribution of the laser beam is flat, i.e., with increase in the beam diameter. The error caused by the slight movement can be corrected by detecting the moving amount.

Figure 30:
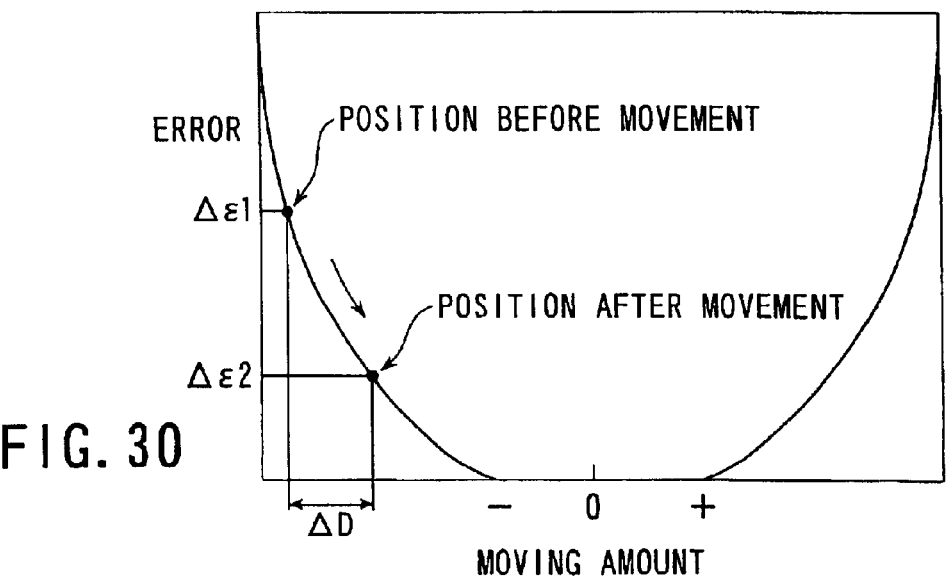
FIG. 30 shows how a measuring error is caused by a lens aberration in the temperature measuring apparatus shown in FIG. 21.

There now follows a description of how to correct the lens aberration of the lenses 425, 426. As described previously, the incident point of the interference fringes S is not changed by the lenses 425, 426, making it unnecessary to adjust the position of the CCD camera 424. However, since the interference fringes S pass through the outer peripheral portions of the lenses 425, 426, the picture image of the interference fringes S is distorted under the influences of the lens aberration. FIG. 30 is a graph showing the relationship between the measuring error caused by the lens aberration and the moving amount (measuring position). Incidentally, the moving amount zero (0) on the abscissa of the graph denotes the case where the interference fringes pass through the center of the lens, i.e., interference fringes B.

The error is defined to be an error from the frequency in the central position of the lens by the result of calculation of the frequency under the condition of a constant temperature. The particular relationship remains unchanged unless a lens having different characteristics is substituted. Therefore, the error can be corrected if the quantitative characteristics of the particular relationship are used as a known value.

As shown in FIG. 30, even a slight moving amount leads to a large error under the influence of the lens aberration if the position before the movement is on the outer circumferential region of the lens. Therefore, a distortion $\epsilon$ is corrected as follows.

Specifically, the actually measured frequency and the error at the position before the movement are set at f1 and $\Delta\epsilon1$, respectively. Likewise, the actually measured frequency and the error at the position after the movement are set at f2 and $\Delta\epsilon2$, respectively. In this case, the frequency f0 before the movement and the frequency f0' after the movement are represented by formulas given below:

$$f0 = f1 \times \{100/(\Delta\epsilon1 + 100)\} \quad (1)$$

$$f0' = f2 \times \{100/(\Delta\epsilon2 + 100)\} \quad (2)$$

Therefore, the distortion $\epsilon$ is represented by:

$$\epsilon = (f0' - f0)/f0 \quad (3)$$

As described above, the temperature measuring apparatus 410 according to the ninth embodiment of the present invention makes it possible to measure the surface temperature of a wafer during the film forming process highly accurately in a non-contact manner by utilizing a concave and convex pattern such as an L/S pattern having the highest probability of presence in each step of a manufacturing process of a semiconductor device. Therefore, a special pattern need not be formed, and the temperature can be measured highly accurately.

Also, the distance between adjacent fringes of the interference fringes is calculated by the frequency analysis, making it possible to perform the temperature measurement highly accurately regardless of the resolution of the CCD camera 424. Further, the frequency analysis of the sine wave is performed by using the maximum entropy method, leading to a measurement of a higher accuracy.

On the other hand, the lenses 425, 426 are used for allowing the interference fringes to be incident on the CCD camera 424 at a predetermined position, making it unnecessary to enlarge or move the CCD camera 424. It should also be noted that the lenses 425, 426 and the CCD camera 424 are integrally arranged within the optical cylinder 427. Therefore, it is possible to ensure a rigidity, to improve the measuring accuracy and to prevent intrusion of the disturbing light. Further, since the inner surface of the optical cylinder 427 is coated with a light absorbing material, it is possible to prevent the irregular reflection of light within the optical cylinder 427.

Further, the aberration of the lenses 425, 426 can be corrected by detecting the moving amount of the interference fringes, leading to the temperature measurement of a further improved accuracy.

Further, the irradiating position of the laser beam L can be changed by using the prism 422 so as to make it possible to measure the temperature at plural positions of the wafer. It follows that it is possible to measure the average temperature of the wafer $\omega e$.

Still further, since the beam diameter adjuster 443 is mounted, it is possible to select the beam diameter adapted for the temperature measurement.

The present invention is not limited to the embodiment described above. For example, in the embodiment described above, a CCD camera is used in the light detecting section. However, it is also possible to use a line sensor or an area sensor prepared by arranging plural line sensors. Of course, the present invention can be worked in variously modified fashions within the technical scope of the present invention.

Figure 31:
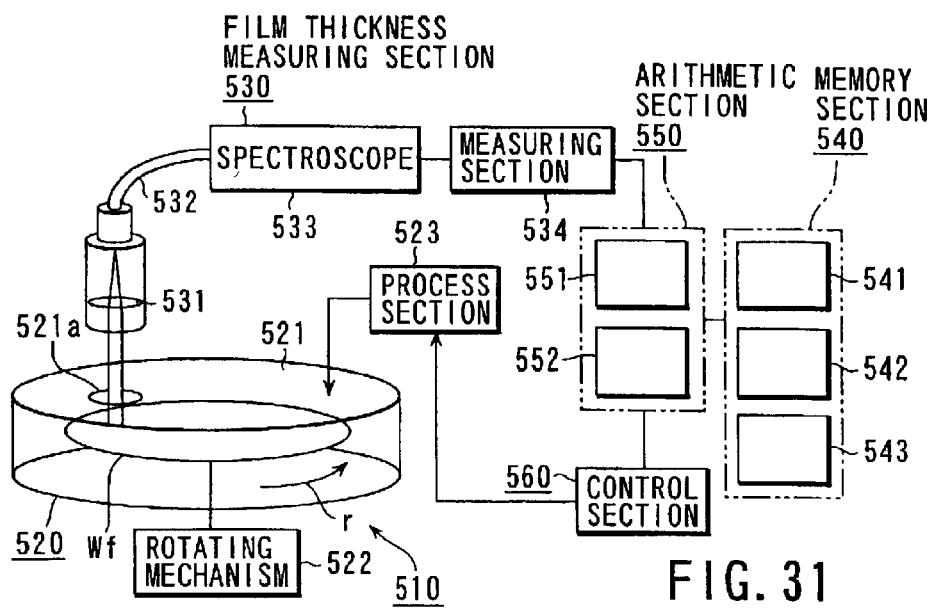
FIG. 31 shows the construction of a CVD apparatus according to a tenth embodiment of the present invention.

FIG. 31 shows a CVD apparatus (process apparatus) 510 including a film thickness measuring apparatus according to a tenth embodiment of the present invention.

The CVD apparatus 510 includes a film forming section 520 and a film thickness measuring section 530. A semiconductor wafer $\epsilon f$ is used as a substrate in the CVD apparatus 510.

The film forming section 520 includes a chamber 521 housing the semiconductor wafer $\epsilon f$, a rotating mechanism 522 for rotating the semiconductor wafer $\epsilon f$ housed in the chamber 521 in a direction denoted by an arrow r in FIG. 31, and a process section 523 in which a predetermined treatment is applied to the semiconductor wafer $\epsilon f$. As shown in the drawing, a view port 521a is formed in the upper surface of the chamber 521.

The film thickness measuring section 530 includes a lens 531 for collecting the light R radiated from the semiconductor wafer $\epsilon f$ through the view port 521a, an optical fiber 532 having one end positioned to face the lens 531 for guiding the radiated light R, a spectroscope 533 aligned with the other end of the optical fiber 532, a measuring section 534 for measuring the intensity of the light split from the radiated light R by the spectroscope 533, a memory section 540 connected to the measuring section 534 and storing various data referred to later, an arithmetic section 550 connected to the measuring section 534 and the memory section 540 for performing arithmetic operations referred to later, and a control section 560 connected to the arithmetic section 540 for controlling the film forming section 520 based on the arithmetic operations performed in the arithmetic section 550.

The memory section 540 includes a reference waveform memory section 541 for storing a waveform $\epsilon 1$ (waveform of light radiated from a reference sample) of the light split from the light radiated from the wafer $\omega f$ (reference wafer) before formation of the underlying film, a first memory section 542 storing a first data base representing the relationship between a peak wavelength and the thickness of the underlying film, said peak wavelength being obtained by dividing a waveform (waveform of light radiated from a measured sample) ω2 of the light radiated from the wafer ωf (measured wafer) after formation of the underlying film by the waveform ω1 of the light radiated from the reference sample, and a second memory section 543 storing a second data base representing the relationship between a peak wavelength and the thickness of the uppermost film, said peak wavelength being obtained by dividing a waveform ω3 of the process radiation for every thickness of the underlying film by the waveform ω2 of the measured sample radiation. It should be noted that the term "data base" noted above represents a graph or formula showing the relationship between the peak wave length and the film thickness. Also, "waveform" denotes a graph showing the relationship between the intensity and the wavelength.

The arithmetic section 550 includes a first arithmetic section 551 for calculating the thickness of the underlying film of the wafer ωf before the film formation thereon on the basis of the measured sample radiation waveform ω2 obtained in the measuring section 534 and the first data base stored in the first memory section 542, and a second arithmetic section 552 for calculating the peak wavelength obtained by dividing the process radiation waveform ω3 obtained in the measuring section 534 by the measured sample radiation waveform ω2, said calculation being performed on the basis of the data base stored in the second memory section 537.

In the CVD apparatus 510 of the construction described above, the thickness of the uppermost film is measured and the film formation is continued until the thickness of the film reaches a predetermined value as follows. It should be noted that the reference sample radiation waveform ω1 is stored in advance in the reference waveform memory section 541. Also, the first data base (see FIG. 32) and the second data base (see FIG. 33) are also stored in advance in the first memory section 542 and the second memory section 543, respectively.

Figure 32:
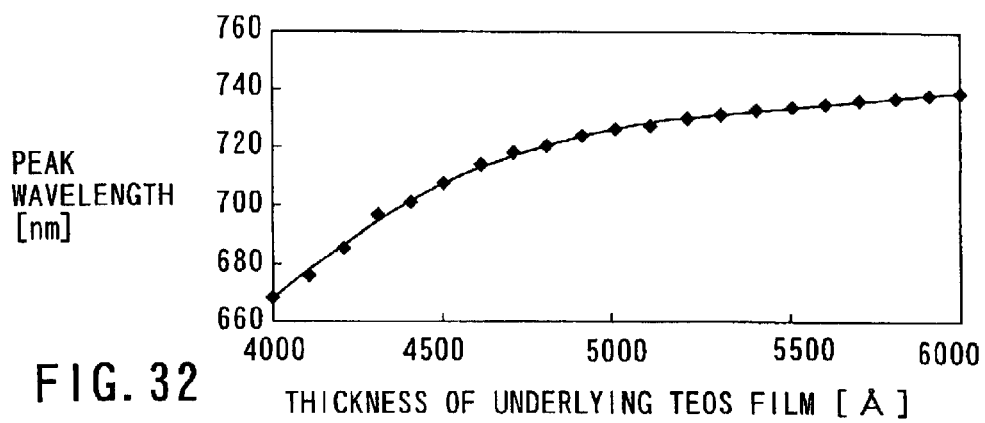
FIG. 32 is a graph showing a first data base of the CVD apparatus shown in FIG. 31.
Figure 33:
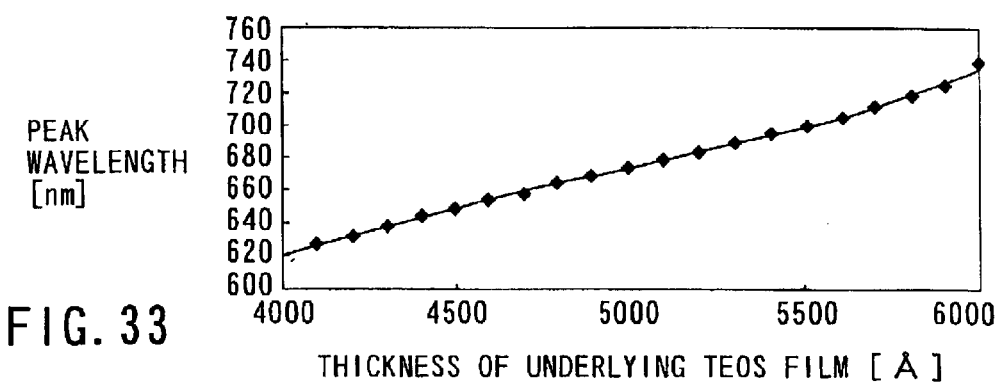
FIG. 33 is a graph showing a second data base of the CVD apparatus shown in FIG. 31.

FIG. 32 is a graph showing the relationship between a peak wavelength and the thickness of an underlying film, covering the case where the underlying film of TEOS (tetraethyl ortho-silicate) is formed in a thickness of 4000 to 6000 Å on the semiconductor wafer ωf, said peak wavelength being obtained by dividing the split radiation waveform before formation of the underlying film. On the other hand, FIG. 33 is a graph showing the relationship between a peak wavelength and the thickness of an underlying film, covering the case where the uppermost poly-Si film is formed in a thickness of 5000 Å on the semiconductor wafer ωf having the underlying film formed thereon in advance, said peak wavelength being obtained by dividing the process radiation waveform ω3 by the measured sample waveform ω2.

Figure 34:
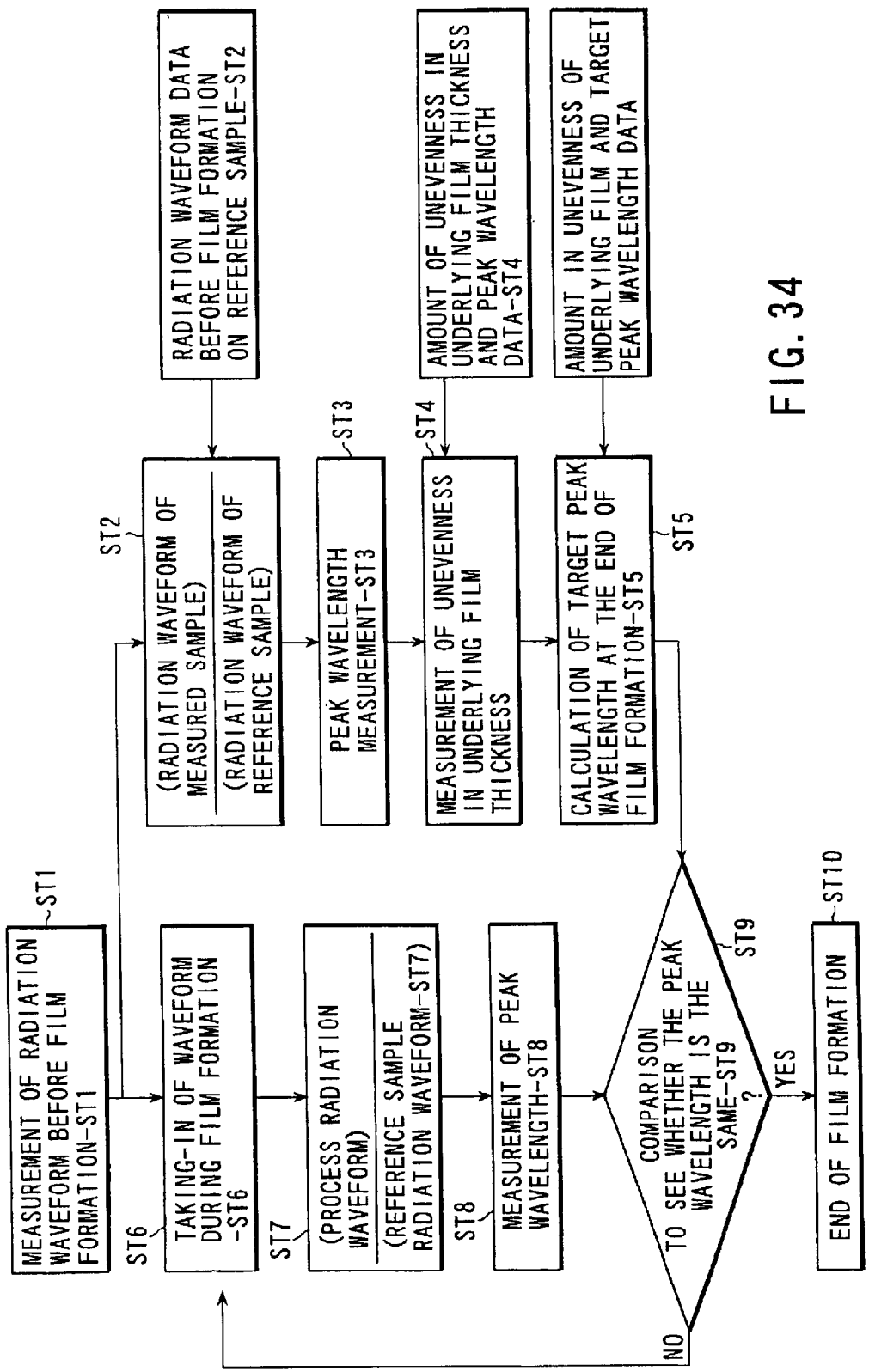
FIG. 34 is a flow chart showing the procedure of formation a film in the CVD apparatus shown in FIG. 31.

FIG. 34 is a flow chart showing the procedure of actually forming a film. This example covers the case where a poly-Si uppermost film is formed in a thickness of 5000 Å on the underlying film.

In the first step, a radiation waveform is measured under the condition that an underlying film alone is formed on the semiconductor wafer ωf so as to obtain a measured sample radiation waveform ω2 (ST1). Then, a reference sample radiation waveform ω1 is read out of the reference waveform memory section 541 to have the measured sample radiation waveform ω2 divided by the reference sample radiation waveform ω2 (ST2) so as to obtain a peak wavelength (ST3).

Then, the first data base is read out of the first memory section 542 so as to calculate the thickness of the underlying film corresponding to the peak wavelength (ST4). Further, the second data base is read out of the second memory section 543 so as to obtain the peak wavelength at the time when the poly-Si uppermost film is formed in a thickness of 5000 Å based on the thickness of the underlying film calculated in step ST4 (ST5). The peak wavelength thus obtained is transmitted to the control section 560.

On the other hand, a film is formed on the semiconductor wafer ωf in the film forming section 520, and the process radiation waveform ω3 during the film formation is continuously measured in the film thickness measuring section 530 (ST6). The process waveform ω3 thus obtained is divided by the measured sample radiation waveform ω2 (ST6) so as to obtain a peak wavelength (ST8). When the peak wavelength thus obtained coincides with the peak wavelength obtained in step ST5, the operation proceeds to step ST9. When the peak wavelength does not coincide with the peak wavelength obtained in step ST5, the operation is brought back to step ST6. In step ST9, a command signal to stop the film formation is supplied from the control section 560 to the film forming section 520.

For example, where the peak wavelength obtained in step ST4 is 725 nm, the operator understands that the thickness of the underlying film is 5000 Å. This indicates that it suffices to stop the film formation at the peak wavelength of 675 nm in step ST5 in the case of forming a poly-Si film in a thickness of 5000 Å.

Also, where the peak wavelength obtained in step ST4 is 708 nm, the operator understands that the thickness of the underlying film is 4500 Å. This indicates that it suffices to stop the film formation at the peak wavelength of 648 nm in step ST5 in the case of forming a poly-Si film in a thickness of 5000 Å.

As described above, in the CVD apparatus 510 according to the tenth embodiment of the present invention, the thickness of the uppermost film during the film formation is measured in accordance with the thickness of the underlying film, making it possible to measure accurately the film thickness without being affected by the difference in thickness of the underlying film. It follows that formation of the uppermost film can be stopped at a target thickness of the film with a high accuracy.

The present invention is not limited to the tenth embodiment described above. For example, the tenth embodiment is directed to a CVD apparatus as a process apparatus. However, the technical idea of the tenth embodiment can also be applied to an etching apparatus. Also, a radiated light is utilized in the tenth embodiment. However, it is also possible to irradiate the wafer with light so as to utilize the light reflected from the wafer. Needless to say, the present invention can be worked in variously modified fashions within the technical scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A temperature measuring method, comprising the steps of:
   detecting an intensity of light radiated from an object and an intensity of light reflected from said object when the object is illuminated with light;
   determining a reflectivity of the object from the intensity of the reflected light and a reference intensity for the reflected light; and determining the temperature of the object from an emissivity obtained from the reflectivity of the object and the intensity of the light radiated from the object, wherein a wavelength band at the time of detecting the intensity of the reflected light is the same as that at the time of detecting the intensity of the light radiated from the object.

2. A temperature measuring method, comprising the steps of:

detecting an intensity of light radiated from an object, an intensity of light reflected from the object when the object is illuminated with light, and an intensity of light transmitted through the object when the object is illuminated with light;

determining a reflectivity of the object from the intensity of the reflected light and a reference intensity for the reflected light;

determining a transmittance of the object from the intensity of the transmitted light and a reference intensity for the transmitted light; and determining the temperature of the object from the reflectivity and from an emissivity obtained from the transmittance of the object and the intensity of the light radiated from the object, wherein a wavelength band at the time of detecting the intensity of the reflected light is the same as that at the time of detecting the intensity of the light radiated from the object.

3. The method according to claim 2, wherein the temperature is calculated based on the reflectivity, the transmittance, and the intensity of the light radiated from the object, represented by formulas:

(emissivity)=1−(reflectivity)−(transmittance)

(Temperature)=$^4\sqrt{(1/\delta)\int}$(emissivity)(intensity of light radiated from object) d λ, and where δ is a Stefan-Boltzmann constant and λ is a wavelength.

4. A temperature measuring method, comprising the steps of:

radiating light form a light source;

transmitting the light radiated from the light source to a surface of an object to be measured and transmitting light reflected and radiated from the object;

turning the light radiated from the light source on and off;

calculating an intensity of the reflected light and an intensity of the radiated light;

calculating a reflectivity of the object to be measured based on the intensity of the reflected light and a reference intensity for reflected light by alternately receiving the light reflected and the light radiated from the object to be measured in synchronism with on and off of the light radiated from the light source; and calculating a temperature of the object to be measured based on the emissivity obtained from the reflectivity and the intensity of the radiated light obtained in the step of detecting the intensity of the reflected light and the intensity of radiated light, wherein in said calculating of the intensities of the reflected light and radiated light, a wavelength band at the time of detecting the intensity of the reflected light is the same as that at the time of detecting the intensity of the light radiated from the object.

5. The method according to claim 4, wherein the step of transmitting the light is capable of transmitting only light components having desired wavelengths by using interference filters.

6. The method according to claim 4, wherein step of transmitting the light is capable of splitting only light components having desired wavelengths by using a spectroscope.

7. The method according to claim 4, wherein the light radiated from the light source is spectral light substantially the same as spectral light radiated from the object to be measured.

8. A temperature measuring method, comprising the steps of:

radiating light from a light source;

transmitting the light radiated from the light source to a surface of an object to be measured and transmitting light reflected and radiated from the object to be measured;

turning the light radiated from the light source on and off;

calculating an intensity of the reflected light and an intensity of the radiated light by alternately receiving the light reflected and the light radiated from the object to be measured in synchronism with on and off of the light radiated from the light source;

calculating an intensity of the transmitted light by receiving transmitted light from the object to be measured in synchronism with on and off of the light radiated from the light source;

calculating a reflectivity of the object to be measured based on the intensity of the reflected light and a reference intensity for reflected light;

calculating a transmittance of the object to be measured based on the intensity of the transmitted light and a reference intensity for transmitted light; and calculating a temperature of the object to be measured based on the emissivity obtained from the reflectivity and the transmittance, and the intensity of radiated light.

9. The method according to claim 8, wherein the step of transmitting the light is capable of transmitting only light components having desired wavelengths by using interference filters.

10. The method according to claim 8, wherein the step of transmitting the light is capable of splitting only light components having desired wavelengths by using a spectroscope.

11. The method according to claim 8, wherein the light radiated from the light source is spectral light substantially the same as spectral light radiated from the object to be measured.

12. A temperature measuring method comprising:

a step of splitting light radiated from a substrate into plural light components having wavelengths ranging over a predetermined wavelength region;

a step of detecting intensity of each of the light components obtained in said light splitting step;

a step of calculating an integrated value of radiation intensity by cumulatively adding the intensities of all of said light components detected in said detecting step; and a step of calculating a surface temperature of said substrate from said integrated value and preset reference data representing a relation between the temperature and the integrated value.

13. A temperature measuring method comprising:

a laser beam applying step for illuminating a pair of reflecting surfaces of an object with a laser beam;

a light detecting step for detecting interference fringes generated by light reflected from said pair of reflecting surfaces; and an arithmetic step for calculating a temperature on the basis of a distance between adjacent ones of the interference fringes detected in the light detecting step.

14. The method according to claim 13, wherein a distance between the interference fringes is calculated in the arithmetic step by subjecting a sine wave obtained from an intensity spectrum distribution of an image to a frequency analysis.

15. The method according to claim 14, wherein the maximum entropy method is employed in said arithmetic step to perform frequency analysis on the sine wave.

16. The method according to claim 13, wherein an optical system for correcting changes is employed for remaining positions where the interference fringes are incident unchanged even if positions of said pair of reflecting surfaces are changed.

17. The method according to claim 16, wherein influence on the interference fringes caused by aberration of the optical system for correcting changes is corrected based on the distance said pair of reflecting surfaces move.

18. The method according to claim 13, the method further comprising the steps of:

measuring a distance said interference fringes move; and calculating a distance said pair of reflecting surfaces move based on the distance said pair of fringes move.

19. The method according to claim 13, wherein an optical system for determining a position is employed in the light detecting step for determining a position at which the laser beam is incident on the object.

20. The method according to claim 19, wherein said optical system for determining the position determines positions in at least two directions on the surface of the object.

21. The method according to claim 13, the method further comprises a step of transmitting only wavelengths of laser beams by using filters before the light detecting step.

22. The method according to claim 13, wherein the laser beam applying step includes a step of adjusting a diameter of the laser beam.

* * * * *